(12) United States Patent
Yerramalli et al.

(10) Patent No.: US 10,716,129 B2
(45) Date of Patent: Jul. 14, 2020

(54) TECHNIQUES FOR TRANSMITTING AND RECEIVING CHANNEL OCCUPANCY IDENTIFIERS OVER AN UNLICENSED RADIO FREQUENCY SPECTRUM BAND

(71) Applicant: QUALCOMM Incorporated, San Diego, CA (US)

(72) Inventors: Srinivas Yerramalli, San Diego, CA (US); Aleksandar Damnjanovic, Del Mar, CA (US); Kiran Kumar Somasundaram, San Diego, CA (US); Tao Luo, San Diego, CA (US); Onkar Jayant Dabeer, Redmond, WA (US); Durga Prasad Malladi, San Diego, CA (US); Naga Bhushan, San Diego, CA (US); Yongbin Wei, La Jolla, CA (US); Peter Gaal, San Diego, CA (US); Wanshi Chen, San Diego, CA (US); Anastasios Stamoulis, San Diego, CA (US); Hao Xu, Beijing (CN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/415,851

(22) Filed: May 17, 2019

(65) Prior Publication Data
US 2019/0274157 A1    Sep. 5, 2019

Related U.S. Application Data

(63) Continuation of application No. 14/791,835, filed on Jul. 6, 2015, now Pat. No. 10,356,807.

(Continued)

(51) Int. Cl.
*H04W 72/12*     (2009.01)
*H04W 74/08*     (2009.01)
(Continued)

(52) U.S. Cl.
CPC ...... *H04W 72/1278* (2013.01); *H04B 7/0811* (2013.01); *H04L 5/0007* (2013.01);
(Continued)

(58) Field of Classification Search
CPC combination set(s) only.
See application file for complete search history.

(56) References Cited

U.S. PATENT DOCUMENTS

2002/0152324 A1    10/2002  Sherman
2006/0182017 A1*   8/2006   Hansen ............ H04B 7/02
                                                370/208
(Continued)

FOREIGN PATENT DOCUMENTS

CN    103748907 A    4/2014
CN    105282858 A    1/2016
(Continued)

OTHER PUBLICATIONS

International Search Report and Written Opinion—PCT/US2015/039309—ISA/EPO—dated Sep. 17, 2015.
(Continued)

*Primary Examiner* — Mandish K Randhawa
(74) *Attorney, Agent, or Firm* — Dalei Dong; Holland & Hart LLP

(57) ABSTRACT

Techniques are described for wireless communication. A first method may include inserting, in a first transmission using a first radio access technology (RAT), a channel occupancy identifier for a second transmission using a second RAT. The first method may also include transmitting the first transmission having the channel occupancy identi-
(Continued)

fier over an unlicensed radio frequency spectrum band. A second method may include receiving, at a receiver operated using a first RAT, a channel occupancy identifier for a transmission using a second RAT. The channel occupancy identifier may be received over an unlicensed radio frequency spectrum band. The second method may also include decoding the channel occupancy identifier to identify a backoff period, and refraining from accessing the unlicensed radio frequency spectrum band using the first RAT based at least in part on the identified backoff period.

22 Claims, 16 Drawing Sheets

Related U.S. Application Data

(60) Provisional application No. 62/040,637, filed on Aug. 22, 2014.

(51) Int. Cl.

| | | |
|---|---|---|
| H04B 7/08 | (2006.01) | |
| H04L 5/00 | (2006.01) | |
| H04L 29/08 | (2006.01) | |
| H04W 52/54 | (2009.01) | |
| H04W 16/14 | (2009.01) | |
| H04W 76/11 | (2018.01) | |

(52) U.S. Cl.
CPC ........... *H04L 67/146* (2013.01); *H04W 52/54* (2013.01); *H04W 74/08* (2013.01); *H04W 16/14* (2013.01); *H04W 76/11* (2018.02)

(56) References Cited

U.S. PATENT DOCUMENTS

| | | | |
|---|---|---|---|
| 2009/0247172 A1 | 10/2009 | Palanki et al. | |
| 2011/0140884 A1 | 6/2011 | Santiago et al. | |
| 2011/0206156 A1 | 8/2011 | Lee et al. | |
| 2012/0087355 A1 | 4/2012 | Wentink | |
| 2013/0294356 A1 | 11/2013 | Bala et al. | |
| 2014/0112284 A1 | 4/2014 | Mansour | |
| 2014/0112289 A1 | 4/2014 | Kim et al. | |
| 2014/0126504 A1 | 5/2014 | Jung et al. | |
| 2014/0293912 A1* | 10/2014 | Chao | H04L 1/1812 370/329 |
| 2014/0321360 A1 | 10/2014 | Han et al. | |
| 2015/0036567 A1 | 2/2015 | Park et al. | |
| 2015/0071060 A1 | 3/2015 | Bhushan et al. | |
| 2015/0249529 A1* | 9/2015 | Zheng | H04L 1/1685 370/336 |
| 2016/0050093 A1 | 2/2016 | Choi et al. | |
| 2016/0057770 A1 | 2/2016 | Yerramalli et al. | |
| 2016/0270085 A1 | 9/2016 | Sorrentino | |
| 2017/0156041 A1 | 6/2017 | Zhang et al. | |
| 2017/0156160 A1 | 6/2017 | Aryafar et al. | |
| 2017/0257776 A1 | 9/2017 | Agardh et al. | |
| 2017/0280331 A1 | 9/2017 | Gou et al. | |

FOREIGN PATENT DOCUMENTS

| | | |
|---|---|---|
| JP | 2004535695 A | 11/2004 |
| WO | WO2006092465 A1 | 9/2006 |
| WO | WO2013167748 A1 | 11/2013 |
| WO | WO2014035415 A1 | 3/2014 |

OTHER PUBLICATIONS

IPEA/EP, Second Written Opinion of the International Preliminary Examining Authority, Int'l Appl. No. PCT/US2015/039309, dated Jun. 29, 2016, European Patent Office, Rijswijk, NL, 5 pgs.

Kim Y., et al., "Duration in L-SIG", IEEE 802.11-10/0534r1, May 17, 2010, Slide 1-18, Internet URL: https://mentor.ieee.org/802.11/dcn/10/11-10-0534-01-00ac-duration-in-l-sig.ppt.

Motorola: "Measurements Impact on MBMS Reception in CELL_FACH: Link and System Results", 3GPP TSG-RAN WG1#39, R1-041301, Nov. 19, 2004, 7 Pages, Internet URL: http://www.3gpp.org/ftp/tsg_ran/WG1_RL1/TSGR1_39/Docs/R1-041301.zip.

Qualcomm Incorporated: "Solutions for Required Functionalities and Design Targets", 3GPP Draft; 3GPP TSG-RAN WG1#78bis, R1-144000, Solutions for Required Functionalities and Design Targets, 3rd Generation Partnership Project (3GPP), Mobile Competence Centre; 650, Route Des Lucioles; F-06921 Sophia-Antipolis, vol. RAN WG1, No. Ljubljana, Slovenia; Oct. 6, 2014-Oct. 10, 2014, Sep. 27, 2014 (Sep. 27, 2014), XP050869665, 5 Pages.

* cited by examiner

TECHNIQUES FOR TRANSMITTING AND RECEIVING CHANNEL OCCUPANCY IDENTIFIERS OVER AN UNLICENSED RADIO FREQUENCY SPECTRUM BAND

CROSS REFERENCES

The present Application for Patent is a continuation of U.S. patent application Ser. No. 14/791,835 by Yerramalli, et al., entitled "Techniques For Transmitting and Receiving Channel Occupancy Identifiers Over an unlicensed Radio Frequency Spectrum Band" filed Jul. 6, 2015, which claims priority to U.S. Provisional Patent Application No. 62/040,637 by Yerramalli et al., entitled "Techniques for Transmitting and Receiving Channel Occupancy Identifiers Over an Unlicensed Radio Frequency Spectrum Band," filed Aug. 22, 2014, assigned to the assignee hereof, which is hereby incorporated by reference in their entirety.

FIELD OF THE DISCLOSURE

The present disclosure, for example, relates to wireless communication systems, and more particularly to techniques for transmitting and receiving channel occupancy identifiers over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time.

In environments in which a base station or UE may be starved of access to a channel of an unlicensed radio frequency spectrum band due to Wi-Fi activity, an extended CCA procedure may be employed to increase the likelihood that the base station or UE will successfully contend for access to the channel of the unlicensed radio frequency spectrum band. A similar procedure is not currently available to Wi-Fi nodes (e.g., Wi-Fi access points and/or Wi-Fi stations).

SUMMARY

The present disclosure, for example, relates to one or more techniques for transmitting and receiving channel occupancy identifiers over an unlicensed radio frequency spectrum band. In some environments, a base station of a cellular network and a Wi-Fi access point of a Wi-Fi network may each be outside the energy detection range of the other. Thus, when contending for access to a channel of an unlicensed radio frequency spectrum band, the base station and the Wi-Fi access point may each determine that the channel is available. However, a user equipment (UE) in communication with the base station and a Wi-Fi station in communication with the Wi-Fi access point may each be within an energy detection range of both the base station and the Wi-Fi access point. The UE may therefore experience interference from transmissions between the Wi-Fi access point and the Wi-Fi station, and the Wi-Fi station may experience interference from transmissions between the base station and the UE. When the UE experiences interference, the base station may contend for access to the channel of the unlicensed radio frequency spectrum band again and use techniques such as rate adaptation (e.g., based at least in part on a channel quality indicator (CQI) reported by the UE) to help the UE recover from the interference. However, when the Wi-Fi station experiences interference, the Wi-Fi access point may be configured to increase a contention window size (e.g., double the contention window size) and delay a subsequent attempt to contend for access to the channel of the unlicensed radio frequency spectrum band by the contention window size. If the Wi-Fi station continues to experience interference, the Wi-Fi access point may continue to increase the contention window size until a maximum (and potentially lengthy) contention window size is reached. This may have the effect of starving the Wi-Fi access point of access to the channel of the unlicensed radio frequency spectrum band.

In an example, a method for wireless communication is described. The method may include inserting, in a first transmission using a first radio access technology (RAT), a channel occupancy identifier for a second transmission using a second RAT. The method may also include transmitting the first transmission having the channel occupancy identifier over an unlicensed radio frequency spectrum band.

In an example, an apparatus for wireless communication is described. The apparatus may include means for inserting, in a first transmission using a first RAT, a channel occupancy identifier for a second transmission using a second RAT. The apparatus may also include means for transmitting the first transmission having the channel occupancy identifier over an unlicensed radio frequency spectrum band.

In an example, another apparatus for wireless communication is described. The apparatus may include a processor and memory in electronic communication with the processor. The processor and memory may be configured to insert, in a first transmission using a first RAT, a channel occupancy identifier for a second transmission using a second RAT. The processor and memory may also be configured to transmit the first transmission having the channel occupancy identifier over an unlicensed radio frequency spectrum band.

In an example, a non-transitory computer-readable medium storing computer-executable code for wireless communication is described. The non-transitory computer-readable medium may include code to insert, in a first transmission using a first RAT, a channel occupancy identifier for a second transmission using a second RAT. The non-transitory computer-readable medium may also include code to transmit the first transmission having the channel occupancy identifier over an unlicensed radio frequency spectrum band.

In some examples of the method, apparatuses, or non-transitory computer-readable medium described above, the channel occupancy identifier may include at least a portion of a Wi-Fi preamble. In some examples, the portion of the Wi-Fi preamble may include at least a first symbol and a second symbol, and the method, apparatuses, or non-transitory computer-readable medium may further include processes, features, means, or code for formatting the Wi-Fi preamble by rotating a constellation of the second symbol with respect to a constellation of the first symbol.

In some examples of the method, apparatuses, or non-transitory computer-readable medium described above, the channel occupancy identifier may identify a duration for which the unlicensed radio frequency spectrum band is reserved, and the duration may include a number of orthogonal frequency division multiplexed (OFDM) symbol periods.

Some examples of the method, apparatuses, or non-transitory computer-readable medium described above may further include processes, features, means, or code for performing a listen before talk (LBT) procedure to contend for access to the unlicensed radio frequency spectrum band, and for transmitting the first transmission having the channel occupancy identifier based at least in part upon winning contention to access the unlicensed radio frequency spectrum band. In some examples, the method, apparatuses, or non-transitory computer-readable medium described above may include processes, features, means, or code for determining whether a resynchronization boundary has passed, and for transmitting the first transmission having the channel occupancy identifier based at least in part upon determining the resynchronization boundary has not passed.

The method, apparatuses, or non-transitory computer-readable medium described above may further include, in some examples, processes, features, means, or code for transmitting the channel occupancy identifier as at least a portion of a channel usage beacon symbol (CUBS). In some examples, the portion of the CUBS may include at least a portion of a fractional CUBS.

In some examples, the method, apparatuses, or non-transitory computer-readable medium described above may include processes, features, means, or code for time-dithering a transmission time of the channel occupancy identifier over the unlicensed radio frequency spectrum band. The method, apparatuses, or non-transitory computer-readable medium may further include, in some examples, processes, features, means, or code for selecting the transmission time based at least in part on a cell identifier. Some examples of the method, apparatuses, or non-transitory computer-readable medium may include processes, features, means, or code for selecting the transmission time based at least in part on a public mobile land network (PLMN) identifier.

In some examples, the processes, features, means, or code for inserting the channel occupancy identifier in the first transmission may include inserting the channel occupancy identifier in a data subframe of the first transmission. In some examples, the processes, features, means, or code for inserting the channel occupancy identifier in the first transmission may include inserting at least a first instance of the channel occupancy identifier and a second instance of the channel occupancy identifier in the first transmission.

In some examples of the method, apparatuses, or non-transitory computer-readable medium described above, transmitting the channel occupancy identifier may be performed by a first transmitting apparatus, where a first portion of the channel occupancy identifier is common to a first portion of an overlapping transmission of a second channel occupancy identifier transmitted by a second transmitting apparatus, and where a second portion of the channel occupancy identifier differs from a second portion of the second channel occupancy identifier transmitted by the second transmitting apparatus. In some examples of the method, apparatuses, or non-transitory computer-readable medium described above, the inserting and transmitting may be performed by a base station of a cellular network. In other examples of the method, apparatuses, or non-transitory computer-readable medium, the inserting and transmitting may be performed by a UE of a cellular network.

In some examples of the method, apparatuses, or non-transitory computer-readable medium described above, the channel occupancy identifier may include at least a portion of a Wi-Fi preamble selected from a group consisting of: an Institute of Electrical and Electronics Engineers (IEEE) Standard 802.11a preamble, an IEEE Standard 802.11n preamble, an IEEE Standard 802.11ac preamble, or an IEEE Standard 802.11ax preamble.

In an example, another method for wireless communication is described. The method may include receiving, at a receiver using a first RAT, a channel occupancy identifier for a transmission using a second RAT. The channel occupancy identifier may be received over an unlicensed radio frequency spectrum band. The method may also include decoding the channel occupancy identifier to identify a backoff period, and refraining from accessing the unlicensed radio frequency spectrum band using the first RAT based at least in part on the backoff period.

In an example, another apparatus for wireless communication is described. The apparatus may include means for receiving, at a receiver using a first RAT, a channel occupancy identifier for a transmission using a second RAT. The channel occupancy identifier may be received over an unlicensed radio frequency spectrum band. The apparatus may also include means for decoding the channel occupancy identifier to identify a backoff period, and means for refraining from accessing the unlicensed radio frequency spectrum band using the first RAT based at least in part on the backoff period.

In an example, another apparatus for wireless communication is described. The apparatus may include a processor and memory in electronic communication with the processor. The processor and memory may be configured to receive, at a receiver using a first RAT, a channel occupancy identifier using a second RAT. The channel occupancy identifier may be received over an unlicensed radio frequency spectrum band. The processor and memory may also be configured to decode the channel occupancy identifier to identify a backoff period, and to refrain from accessing the unlicensed radio frequency spectrum band using the first RAT based at least in part on the backoff period.

In an example, another non-transitory computer-readable medium storing computer-executable code for wireless communication is described. The non-transitory computer-readable medium may include code to receive, at a receiver using a first RAT, a channel occupancy identifier for a transmission using a second RAT. The channel occupancy identifier may be received over an unlicensed radio frequency spectrum band. The non-transitory computer-readable medium may also include code to decode the channel occupancy identifier to identify a backoff period, and to refrain from accessing the unlicensed radio frequency spectrum band using the first RAT based at least in part on the backoff period.

In some examples of the method, apparatuses, or non-transitory computer-readable medium described above, the channel occupancy identifier may include at least a portion of a Wi-Fi preamble. Some examples of the method, apparatuses, or non-transitory computer-readable medium may further include processes, features, means, or code for detecting an energy level of the unlicensed radio frequency spectrum band. Some examples may further include processes, features, means, or code for refraining from accessing the unlicensed radio frequency spectrum band using the first RAT based at least in part on the energy level. In some examples, the method, apparatuses, or non-transitory computer-readable medium described above may include processes, features, means, or code for refraining from accessing the unlicensed radio frequency spectrum band using the first RAT when the energy level fails to satisfy a threshold.

Some examples of the method, apparatuses, or non-transitory computer-readable medium described above may include processes, features, means, or code for decoding the channel occupancy identifier to determine whether the channel occupancy identifier was received from a first transmitter using the first RAT or a second transmitter using the second RAT. In some examples of the method, apparatuses, or non-transitory computer-readable medium described above, the backoff period may include a number of OFDM symbol periods. In some examples, the receiver using the first RAT may include a cellular receiver of a UE. In other examples, the receiver using the first RAT may include a cellular receiver of a base station.

In an example, another method for wireless communication is described. The method may include receiving, at a receiver using a first RAT, a channel occupancy identifier for a transmission using the first RAT. The channel occupancy identifier may be received over an unlicensed radio frequency spectrum band from a transmitter using a second RAT. The method may also include decoding the channel occupancy identifier to identify a backoff period, and refraining from accessing the unlicensed radio frequency spectrum band using the first RAT based at least in part on the backoff period.

In an example, another apparatus for wireless communication is described. The apparatus may include means for receiving, at a receiver using a first RAT, a channel occupancy identifier for a transmission using the first RAT. The channel occupancy identifier may be received over an unlicensed radio frequency spectrum band from a transmitter using a second RAT. The apparatus may also include means for decoding the channel occupancy identifier to identify a backoff period, and means for refraining from accessing the unlicensed radio frequency spectrum band using the first RAT based at least in part on the backoff period.

In an example, another apparatus for wireless communication is described. The apparatus may include a processor and memory in electronic communication with the processor. The processor and memory may be configured to receive, at a receiver operated using a first RAT, a channel occupancy identifier for a transmission using the first RAT. The channel occupancy identifier may be received over an unlicensed radio frequency spectrum band from a transmitter using a second RAT. The processor and memory may also be configured to decode the channel occupancy identifier to identify a backoff period, and to refrain from accessing the unlicensed radio frequency spectrum band using the first RAT based at least in part on the backoff period.

In an example, another non-transitory computer-readable medium storing computer-executable code for wireless communication is described. The non-transitory computer-readable medium may include code to receive, at a receiver using a first RAT, a channel occupancy identifier for a transmission using the first RAT. The channel occupancy identifier may be received over an unlicensed radio frequency spectrum band from a transmitter using a second RAT. The non-transitory computer-readable medium may also include code to decode the channel occupancy identifier to identify a backoff period, and to refrain from accessing the unlicensed radio frequency spectrum band using the first RAT based at least in part on the backoff period.

The method, apparatuses, or computer-readable medium described above may include processes, features, means, or code for refraining from increasing a contention window size upon identifying the backoff period. In some examples of the method, apparatuses, or computer-readable medium described above, the channel occupancy identifier may include at least a portion of a Wi-Fi preamble.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
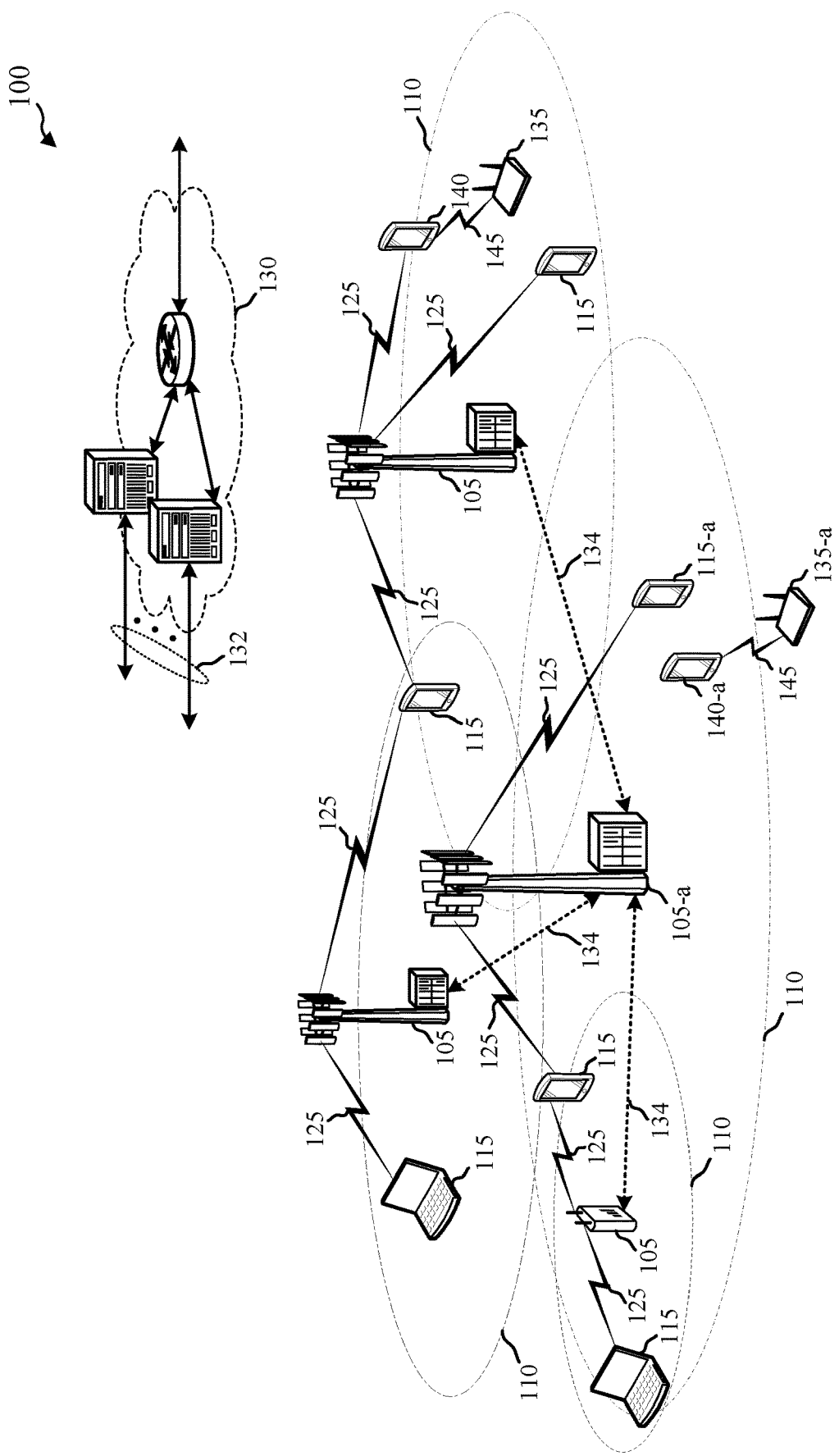
FIG. 1 illustrates an example of a wireless communication system, in accordance with various aspects of the disclosure.

Techniques are described in which an unlicensed radio frequency spectrum band is used for at least a portion of communications over a wireless communication system. In some examples, the unlicensed radio frequency spectrum band may be used by base stations and user equipments (UEs) of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed radio frequency spectrum band may be used by the cellular network in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time. In environments in which a base station or UE may be starved of access to a channel of an unlicensed radio frequency spectrum band due to Wi-Fi activity, an extended CCA procedure may be employed to increase the likelihood that the base station or UE will successfully contend for access to the channel of the unlicensed radio frequency spectrum band. An extended CCA procedure involves the performance of a random number of CCA procedures (from 1 to q), in accordance with an extended CCA counter. Regardless of whether a single CCA procedure or plurality of CCA procedures is performed, each CCA procedure may include detecting an energy level on the channel of the unlicensed radio frequency spectrum band and determining whether the energy level is below a threshold. When the energy level is below the threshold, the CCA procedure is successful and contention to access the channel of the unlicensed radio frequency spectrum band may be successful. When the energy level exceeds the threshold, the CCA procedure is unsuccessful and contention to access the channel of the unlicensed radio frequency spectrum band may be unsuccessful.

When a CCA procedure or extended CCA procedure is successful, a transmission may be made over the channel of the unlicensed radio frequency spectrum band. When a packet error is encountered (e.g., due to a collision of transmissions made by two or more transmitting apparatuses, or due to poor channel conditions), a hybrid automatic repeat request (HARD)-based retransmission may be performed. In some examples, the retransmission may be modified from the original transmission using rate adaptation (e.g., based at least in part on a channel quality indicator (CQI) reported by a UE).

Prior to gaining access to, and communicating over, an unlicensed radio frequency spectrum band, a Wi-Fi access point or Wi-Fi station may perform a carrier sense multiple access (CSMA) procedure in which the Wi-Fi access point or Wi-Fi station both 1) detects an energy level on the channel of the unlicensed radio frequency spectrum band and determines whether the energy level is below a threshold, and 2) listens for transmissions of Wi-Fi preambles over the channel of the unlicensed radio frequency spectrum band. The energy level at which Wi-Fi preambles are detected may be lower, and in some examples much lower, than the threshold to which the energy level on the channel of the unlicensed radio frequency spectrum band is compared. When the energy level is below the threshold and the Wi-Fi node (e.g., the Wi-Fi access point or the Wi-Fi station) does not detect the transmission of a Wi-Fi preamble, the Wi-Fi node may access the channel of the unlicensed radio frequency spectrum band. When the energy level exceeds the threshold, or when the Wi-Fi node detects the transmission of a Wi-Fi preamble, the Wi-Fi node may start a backoff counter based on a contention window size, and may refrain from accessing the channel of the unlicensed radio frequency spectrum band until the backoff counter has expired.

Each time that the Wi-Fi node determines that the energy level exceeds the threshold, detects a transmission of a Wi-Fi preamble, and/or receives a non-acknowledgement (NACK) from a Wi-Fi node to which a transmission was made, the Wi-Fi node may increase (e.g., double) the size of the contention window, to reduce the probability of a data collision or interference during a next transmission to or from the Wi-Fi node. In the case of Medium Access Control (MAC) protocol data unit (MPDU) aggregation, the contention window size may increase when all of the MPDUs are wrongly decoded by a receiving apparatus. The size of the contention window may be decreased (e.g., reset to a smallest size) upon the Wi-Fi node successfully gaining access to the channel of the unlicensed radio frequency spectrum band. With respect to a Wi-Fi node's receipt of a NACK, there is no mechanism for adjusting one or more parameters of a retransmission (e.g., based on a reported CQI).

The asymmetry between the channel access mechanisms and rate adaptation mechanisms used by cellular nodes and Wi-Fi nodes may result in one or more Wi-Fi nodes being starved of access to a shared channel of an unlicensed radio frequency spectrum band by one or more cellular nodes. As described herein, this Wi-Fi node starvation problem may be mitigated by inserting a channel occupancy identifier decodable by a Wi-Fi radio access technology (RAT) in a transmission over an unlicensed radio frequency spectrum band using a cellular RAT.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include a cellular network and a Wi-Fi network. The cellular network may include one or more base stations 105, 105-a, one or more UEs 115, 115-a, and a core network 130. The Wi-Fi network may include one or more Wi-Fi access points 135, 135-a and one or more Wi-Fi stations 140, 140-a.

With reference to the cellular network of the wireless communication system 100, the core network 130 may provide user authentication, access authorization, tracking, Internet Protocol (IP) connectivity, and other access, routing, or mobility functions. The base stations 105, 105-a may interface with the core network 130 through backhaul links 132 (e.g., Si, etc.) and may perform radio configuration and scheduling for communication with the UEs 115, 115-a, or may operate under the control of a base station controller (not shown). In various examples, the base stations 105, 105-a may communicate, either directly or indirectly (e.g., through core network 130), with each other over backhaul links 134 (e.g., X1, etc.), which may be wired or wireless communication links.

The base stations 105, 105-a may wirelessly communicate with the UEs 115, 115-a via one or more base station antennas. Each of the base stations 105, 105-a may provide communication coverage for a respective geographic coverage area 110. In some examples, a base station 105, 105-a may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-a may be divided into sectors making up a portion of the coverage area (not shown). The cellular network may include base stations 105, 105-a of different types (e.g., macro and/or small cell base stations). There may be overlapping geographic coverage areas for different technologies.

In some examples, the cellular network may include an LTE/LTE-A network. In LTE/LTE-A networks, the term evolved Node B (eNB) may be used to describe the base stations 105, 105-a, while the term UE may be used to describe the UEs 115, 115-a. The cellular network may be a Heterogeneous LTE/LTE-A network in which different types of eNBs provide coverage for various geographical regions. For example, each eNB or base station 105, 105-a may provide communication coverage for a macro cell, a small cell, and/or other type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between UEs 115, 115-a and the base stations 105, 105-a or core network 130 supporting radio bearers for the user plane data. At the Physical (PHY) layer, the transport channels may be mapped to Physical channels.

The UEs 115, 115-a may be dispersed throughout the wireless communication system 100, and each of the UEs 115, 115-a may be stationary or mobile. A UE 115 or 115-a may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-a may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-a and network equipment, including macro eNBs, small cell eNBs, relay base stations, and the like.

The communication links 125 shown in wireless communication system 100 may carry downlink (DL) transmissions from a base station 105, 105-a to a UE 115, 115-a, and/or uplink (UL) transmissions from a UE 115, 115-a to a base station 105, 105-a. The downlink transmissions may also be called forward link transmissions, while the uplink transmissions may also be called reverse link transmissions.

In some examples, each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplex (FDD) operation (e.g., using paired spectrum resources) or a time domain duplex (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, 105-a and/or UEs 115, 115-a may include multiple antennas for employing antenna diversity schemes to improve communication quality and reliability between base stations 105, 105-a and UEs 115, 115-a. Additionally or alternatively, base stations 105, 105-a and/or UEs 115, 115-a may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-a may be configured with multiple downlink CCs and one or more uplink CCs for carrier aggregation. Carrier aggregation may be used with both FDD and TDD component carriers.

With reference to the Wi-Fi network of the wireless communication system 100, the Wi-Fi access points 135, 135-a may wirelessly communicate with the Wi-Fi stations 140, 140-a via one or more Wi-Fi access point antennas, over one or more communication links 145. In some examples, the Wi-Fi access points 135, 135-a may communicate with the Wi-Fi stations 140, 140-a using one or more Wi-Fi communication standards, such as an Institute of Electrical and Electronics (IEEE) Standard 802.11 (e.g., IEEE Standard 802.11a, IEEE Standard 802.11n, IEEE Standard 802.11ac, or IEEE Standard 802.11ax).

In some examples, a Wi-Fi station 140, 140-a may be a cellular phone, a smartphone, a personal digital assistant (PDA), a wireless communication device, a handheld device, a tablet computer, a laptop computer, or the like. In some examples, an apparatus may include aspects of both a UE 115, 115-a and a Wi-Fi station 140, 140-a, and such an apparatus may communicate with one or more base stations 105, 105-a using a first radio access technology (RAT) (e.g., a cellular RAT, or multiple cellular RATs), and communicate with one or more Wi-Fi access points 135, 135-a using a second RAT (e.g., a Wi-Fi RAT, or multiple Wi-Fi RATs).

In some examples, the base stations 105, 105-a and UEs 115, 115-a may communicate over a licensed radio frequency spectrum band and/or an unlicensed radio frequency spectrum band, whereas the Wi-Fi access points 135, 135-a and Wi-Fi stations 140, 140-a may communicate over the unlicensed radio frequency spectrum band. The unlicensed radio frequency spectrum band may therefore be shared by the base stations 105, 105-a, the UEs 115, 115-a, the Wi-Fi access points 135, 135-a, and/or the Wi-Fi stations 140, 140-a. Because the unlicensed radio frequency spectrum band may be shared by apparatuses operating under different protocols (e.g., different RATs), transmitting apparatuses may contend for access to the unlicensed radio frequency spectrum band.

Figure 2:
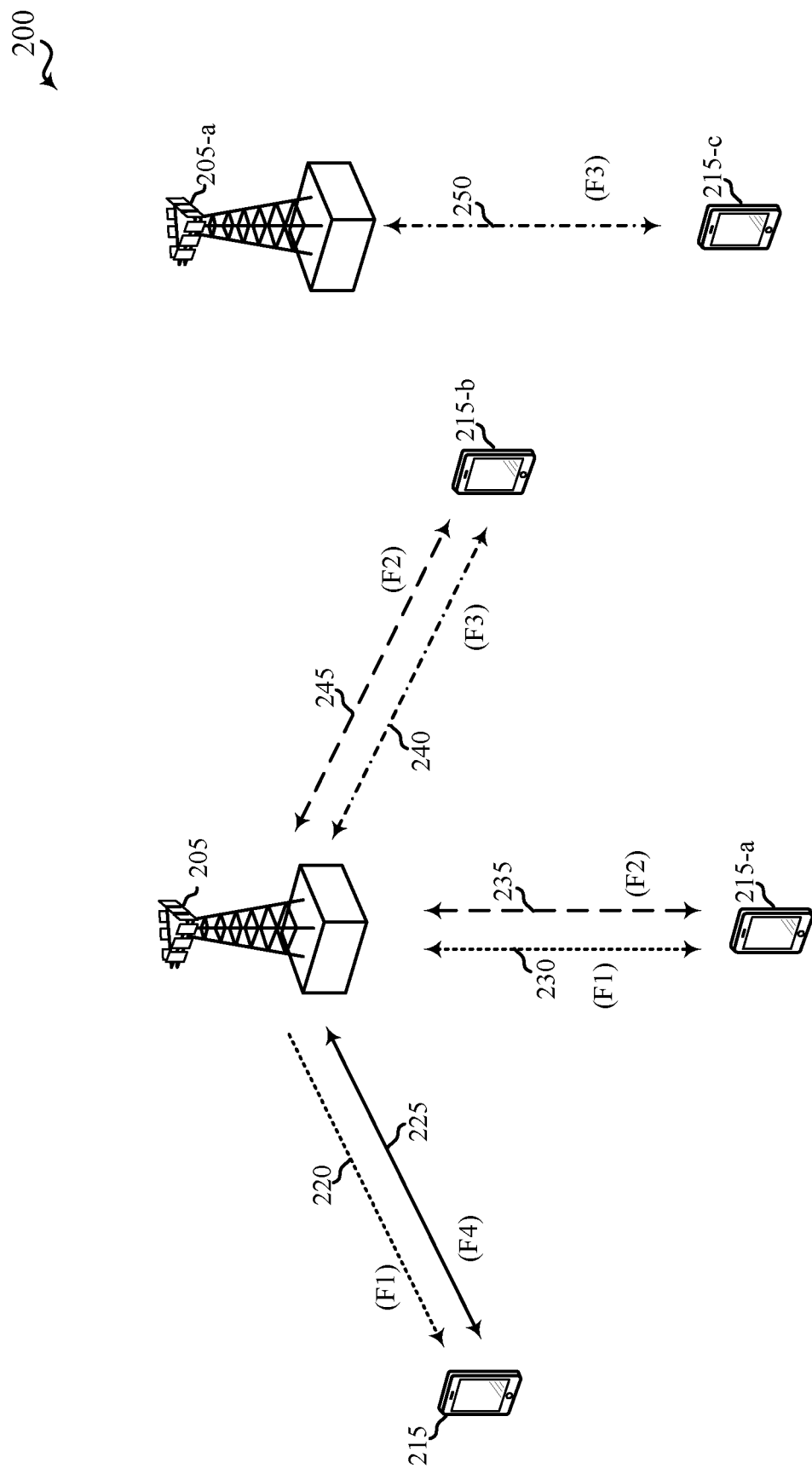
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105, 105-a described with reference to FIG. 1, while a first UE 215, a second UE 215-a, a third UE 215-b, and a fourth UE 215-c may be examples of aspects of one or more of the UEs 115, 115-a described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum band and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum band and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 105-a, 205, and/or 205-a described with reference to FIGS. 1 and/or 2, and/or one of the UEs 115, 115-a, 215, 215-a, 215-b, and/or 215-c described with reference to FIGS. 1 and/or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve and/or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
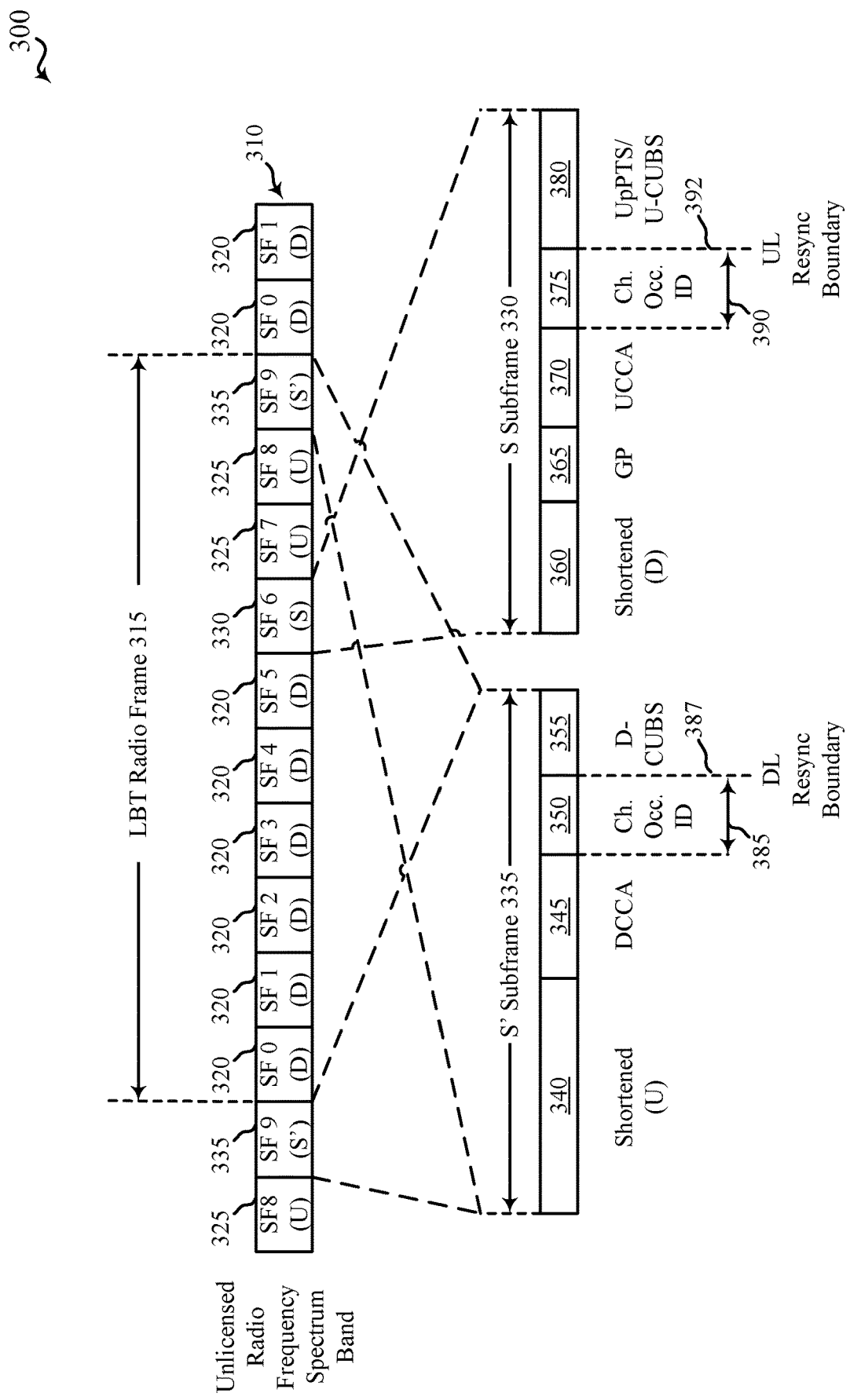
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink (D) subframes 320 and uplink (U) subframes 325, while the S' subframe 335 may provide a transition between uplink (U) subframes 325 and downlink (D) subframes 320.

During the S' subframe 335, a downlink clear channel assessment (DCCA) procedure 345 may be performed by one or more base stations, such as one or more of the base stations 105, 105-a, 205, and/or 205-a described with reference to FIGS. 1 and/or 2, to reserve, for a period of time, a channel of the unlicensed radio frequency spectrum band over which the wireless communication 310 occurs. Following a successful DCCA procedure 345 by a base station, the base station may transmit a channel usage beacon signal (CUBS) (e.g., a downlink CUBS (D-CUBS 355)) to provide an indication to other base stations and/or apparatuses (e.g., UEs, Wi-Fi access points, etc.) that the base station has reserved the channel. In some examples, a D-CUBS 355 may be transmitted using a plurality of interleaved resource blocks. Transmitting a D-CUBS 355 in this manner may enable the D-CUBS 355 to occupy at least a some percentage of the available frequency spectrum bandwidth of the unlicensed radio frequency spectrum band and satisfy one or more regulatory requirements (e.g., a requirement that transmissions over the unlicensed radio frequency spectrum band occupy at least 80% of the available frequency spectrum bandwidth). The D-CUBS 355 may in some examples take a form similar to that of an LTE/LTE-A cell-specific reference signal (CRS) and/or a channel state information reference signal (CSI-RS). When the DCCA procedure 345 fails, the D-CUBS 355 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to a channel of the unlicensed radio frequency spectrum band to transmit a channel occupancy identifier 350 (Ch. Occ. ID 350). A fourth portion of the S' subframe 335 may be used by the one or more base stations that successfully contended for access to a channel of the unlicensed radio frequency spectrum band to transmit the D-CUBS 355.

In some examples, the channel occupancy identifier 350 may be transmitted when the DCCA procedure 345 is successfully completed (e.g., when contention to access the channel of the unlicensed radio frequency spectrum band is won) prior to a downlink resynchronization boundary 387, but not transmitted when the DCCA procedure 345 is not successfully completed (or when the DCCA procedure 345 is successfully completed after the downlink resynchronization boundary 387 has passed). This may help to avoid interfering with other transmitting apparatuses that have already begun transmitting.

During the S subframe 330, an uplink CCA (UCCA) procedure 370 may be performed by one or more UEs, such as one or more of the UEs 115, 115-a, 215, 215-a, 215-b, and/or 215-c described above with reference to FIGS. 1 and/or 2, to reserve, for a period of time, the channel over which the wireless communication 310 occurs. Following a successful UCCA procedure 370 by a UE, the UE may transmit an uplink CUBS (U-CUBS 380) to provide an indication to other UEs and/or apparatuses (e.g., base stations, Wi-Fi access points, etc.) that the UE has reserved the channel. In some examples, a U-CUBS 380 may be transmitted using a plurality of interleaved resource blocks. Transmitting a U-CUBS 380 in this manner may enable the U-CUBS 380 to occupy at least some percentage of the available frequency spectrum bandwidth of the unlicensed radio frequency spectrum band and satisfy one or more regulatory requirements (e.g., the requirement that transmissions over the unlicensed radio frequency spectrum band occupy at least 80% of the available frequency spectrum bandwidth). The U-CUBS 380 may in some examples take a form similar to that of an LTE/LTE-A CRS and/or CSI-RS. When the UCCA procedure 370 fails, the U-CUBS 380 may not be transmitted.

The S subframe 330 may include a plurality of OFDM symbol periods (e.g., 14 OFDM symbol periods). A first portion of the S subframe 330 may be used by a number of base stations as a shortened downlink (D) period. A second portion of the S subframe 330 may be used as a guard period (GP) 365. A third portion of the S subframe 330 may be used for the UCCA procedure 370. A fourth portion of the S subframe 330 may be used by one or more UEs that successfully contend for access to a channel of the unlicensed radio frequency spectrum band to transmit a channel occupancy identifier 375 (Ch. Occ. ID 375). A fifth portion of the S subframe 330 may be used by the one or more UEs that successfully contended for access to a channel of the unlicensed radio frequency spectrum band as an uplink pilot time slot (UpPTS) and/or to transmit the U-CUBS 380.

In some examples, the channel occupancy identifier 375 may be transmitted when the UCCA procedure 370 is successfully completed (e.g., when contention to access the channel of the unlicensed radio frequency spectrum band is won) prior to an uplink resynchronization boundary 392, but not transmitted when the UCCA procedure 370 is not successfully completed (or when the UCCA procedure 370 is successfully completed after the uplink resynchronization boundary 392 has passed). This may help to avoid interfering with the transmissions of other UEs that have already begun transmitting.

In some examples, the DCCA procedure 345 and/or the UCCA procedure 370 may include the performance of a single CCA procedure. In other examples, the DCCA procedure 345 and/or the UCCA procedure 370 may include the performance of an extended CCA procedure. The extended CCA procedure may include a random number of CCA procedures, and in some examples may include a plurality of CCA procedures. In some examples, the DCCA procedure 345 and/or the UCCA procedure 370 may not be completed before a respective downlink resynchronization boundary 387 or uplink resynchronization boundary 392. In such examples, the channel occupancy identifier 350 and/or 375 may be transmitted when the DCCA procedure 345 and/or the UCCA procedure 370 is successfully completed before the respective downlink resynchronization boundary 387 or uplink resynchronization boundary 392, but not transmitted when the DCCA procedure 345 and/or the UCCA procedure 370 is not successfully completed before the respective downlink resynchronization boundary 387 or uplink resynchronization boundary 392.

In some examples, the channel occupancy identifier 350 may have a first duration 385, and the channel occupancy identifier 375 may have a second duration 390. In some examples, the first duration 385 and the second duration 390 may be the same duration. In some examples, the channel occupancy identifier 350 and/or 375 may not be transmitted, and may be replaced, for example, by an additional D-CUBS 355 and/or a fractional D-CUBS (e.g., in the S' subframe 335), or by an additional U-CUBS 380 and/or a fractional U-CUBS (e.g., in the S subframe 330). In some examples, the channel occupancy identifier 350 and/or 375 may be transmitted as at least a portion of a CUBS (e.g., at least a portion of the D-CUBS 355 or the U-CUBS 380), and the channel occupancy identifier 350 and/or 375 may serve to reserve part or all of the unlicensed radio frequency spectrum band during its transmission over the unlicensed radio frequency spectrum band. In some examples, the portion of the CUBS in which the channel occupancy identifier 350 and/or 375 is transmitted may include at least a portion of a fractional CUBS (e.g., a fractional D-CUBS or a fractional U-CUBS).

In examples in which the channel occupancy identifier 350 and/or 375 is transmitted, the channel occupancy identifier 350 and/or 375 may be formatted according to a Wi-Fi RAT, and may identify a duration (e.g., a backoff period) for which the channel of the unlicensed radio frequency spectrum band is reserved. With respect to the channel occupancy identifier 350, the identified duration may include, for example, the duration of a downlink transmission and/or the duration of the LBT radio frame 315. With respect to the channel occupancy identifier 375, the identified duration may include, for example, the duration of an uplink transmission. In some examples, the duration may include a number of OFDM symbol periods and/or a number of bytes. In some examples, the channel occupancy identifier 350 and/or 375 may include at least a portion of a Wi-Fi preamble. For example, the channel occupancy identifier 350 and/or 375 may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

Figure 4:
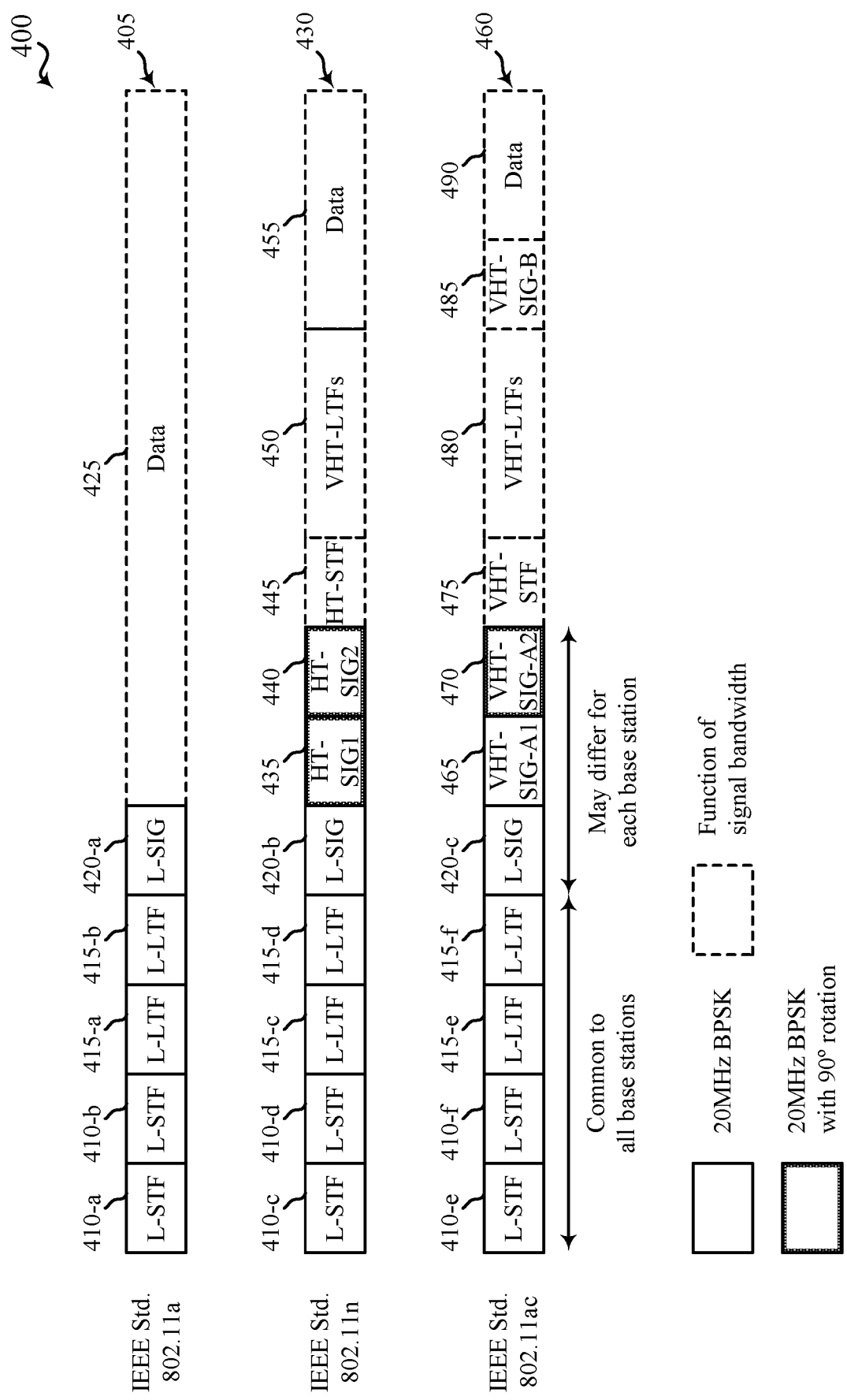
FIG. 4 shows examples of a first Wi-Fi packet, a second Wi-Fi packet, and a third Wi-Fi packet, in which a portion or all of a Wi-Fi preamble of the first Wi-Fi packet, the second Wi-Fi packet, and/or the third Wi-Fi packet may be used as a channel occupancy identifier, in accordance with various aspects of the present disclosure.

FIG. 4 shows examples 400 of a first Wi-Fi packet 405, a second Wi-Fi packet 430, and a third Wi-Fi packet 460, in which a portion or all of a Wi-Fi preamble of the first Wi-Fi packet 405, the second Wi-Fi packet 430, and/or the third Wi-Fi packet 460 may be used as a channel occupancy identifier, in accordance with various aspects of the present disclosure. In some examples, a portion or all of the Wi-Fi preamble of one of the first Wi-Fi packet 405, the second Wi-Fi packet 430, and/or the third Wi-Fi packet 460 may be used as the channel occupancy identifier 350 and/or 375 described with reference to FIG. 3.

The first Wi-Fi packet 405 may take the form of an IEEE Standard 802.11a packet and include a plurality of symbols. In some examples, each of the symbols may include a minimum of 24 bits and have a duration of four microseconds (4 μs). In some examples, the symbols may include a first non-high throughput short training field symbol (L-STF 410-a) and a second non-high throughput short training field symbol (L-STF 410-b), a first non-high throughput long training field symbol (L-LTF 415-a) and a second non-high throughput long training field symbol (L-LTF 415-b), a first non-high throughput signal field symbol (L-SIG 420-a), and a number of symbols defining a variable length data field 425. The first L-STF 410-a and the second L-STF 410-b, the first L-LTF 415-a and the second L-LTF 415-b, and the first L-SIG 420-a define an IEEE Standard 802.11a preamble. In some examples, the first L-SIG 420-a may include rate information. The first L-SIG 420-a may also include a 12-bit length field indicating a number of bytes in the first Wi-Fi packet 405. The maximum number of bytes that may be indicated by a 12-bit length field is 4096 bytes. Therefore, the maximum number of symbols that may be included in the first Wi-Fi packet 405 may be determined by the ceiling function: cell (4096*8/24)+1=1367. In these examples, the maximum duration that may be indicated by the 12-bit length field of the first L-SIG 420-a is 1367*4 μs=5.468 milliseconds (5.468 ms). However, some legacy implementations of IEEE Standard 802.11a may reject (e.g., not properly decode) any value of the 12-bit length field that is greater than 2340 bytes or 3.124 ms (i.e., the maximum allowed MAC layer protocol data unit (MPDU) size before the release of IEEE Standard 802.11n). In some examples, an IEEE Standard 802.11a preamble may be used as a channel occupancy identifier (e.g., as the channel occupancy identifier 350 and/or 375 described with reference to FIG. 3), with the 12-bit length field used to indicate a duration (e.g., a backoff period) of up to 5.468 ms (or 3.124 ms) for which an unlicensed radio frequency spectrum band is reserved.

The second Wi-Fi packet 430 may take the form of an IEEE Standard 802.11n packet and include a plurality of symbols. In some examples, each of the symbols may include a minimum of 24 bits and have a duration of four microseconds (4 μs). In some examples, the symbols may include a third L-STF 410-c and a fourth L-STF 410-d, a third L-LTF 415-c and a fourth L-LTF 415-d, a second L-SIG 420-b, a first high throughput signal field symbol (HT-SIG1 435), a second high throughput signal field symbol (HT-SIG2 440), a high throughput short training field symbol (HT-STF 445), a number of very high throughput long training field symbols (VHT-LTFs 450), and a number of symbols defining a variable length data field 455. The third L-STF 410-c and the fourth L-STF 410-d, the third L-LTF 415-c and the fourth L-LTF 415-d, the second L-SIG 420-b, the HT-SIG1 435, the HT-SIG2 440, the HT-STF 445, and the VHT-LTFs 450 may define an IEEE Standard 802.11n preamble. In some examples, the second Wi-Fi packet 430 may be a mixed format packet, with the third L-STF 410-c and the fourth L-STF 410-d, the third L-LTF 415-c and the fourth L-LTF 415-d, and the second L-SIG 420-b being backward-compatible with their corresponding symbols (the first L-STF 410-a and the second L-STF 410-b, the first L-LTF 415-a and the second L-LTF 415-b, and the first L-SIG 420-a) in a legacy IEEE Standard 802.11a packet. The HT-SIG1 435 and HT-SIG2 440 include 16 bits for indicating a number of bytes in the second Wi-Fi packet 430, and thus, when an IEEE Standard 802.11n preamble is used as a channel occupancy identifier (e.g., the channel occupancy identifier 350 and/or 375 described with reference to FIG. 3), the 16 bits may indicate a duration (e.g., a backoff period) of up to 87.488 ms (5.468 ms*16) for which an unlicensed radio frequency spectrum band is reserved. However, legacy apparatuses configured to communicate using IEEE Standard 802.11a packets may not be able to decode a duration carried in an HT-SIG1 435 and HT-SIG2 440 of an IEEE Standard 802.11n packet.

The third Wi-Fi packet 460 may take the form of an IEEE Standard 802.11ac packet and include a plurality of symbols. In some examples, each of the symbols may include a minimum of 24 bits and have a duration of four microseconds (4 μs). In some examples, the symbols may include a fifth L-STF 410-e and a sixth L-STF 410-f, a fifth L-LTF 415-e and a sixth L-LTF 415-f, a third L-SIG 420-c, a first very high throughput signal field symbol (VHT-SIG-A1 465), a second very high throughput signal field symbol (VHT-SIG-A2 470), a very high throughput-short training field symbol (VHT-STF 475), a number of VHT-LTFs 480, a very high throughput signal field symbol (VHT-SIG-B 485), and a number of symbols defining a variable length data field 490. The fifth L-STF 410-e and the sixth L-STF 410-f, the fifth L-LTF 415-e and the sixth L-LTF 415-f, the third L-SIG 420-c, the VHT-SIG-A1 465, the VHT-SIG-A2 470, the VHT-STF 475, the VHT-LTFs 480, and the VHT-SIG-B 485 may define an IEEE Standard 802.11ac preamble. In some examples, the third Wi-Fi packet 460 may be a mixed format packet, with the fifth L-STF 410-e and the sixth L-STF 410-f, the fifth L-LTF 415-e and the sixth L-LTF 415-f, and the third L-SIG 420-c being backward-compatible with their corresponding symbols in a legacy IEEE Standard 802.11a packet and a legacy IEEE Standard 802.11n packet. However, apparatuses configured to communicate using IEEE Standard 802.11ac packets may interpret the 12-bit length field of the third L-SIG 420-*c* as a number of OFDM symbol periods instead of a number of bytes. When an IEEE Standard 802.11ac preamble is used as a channel occupancy identifier (e.g., the channel occupancy identifier 350 and/or 375 described with reference to FIG. 3), and the 12-bit length field of the third L-SIG 420-*c* is interpreted as a number of OFDM symbol periods, the 12 bits may indicate a duration (e.g., a backoff period) of up to 16.384 ms (4096*4 μs). In addition, legacy apparatuses configured to communicate using IEEE Standard 802.11a packets and/or IEEE Standard 802.11n packets should correctly decode an IEEE Standard 802.11ac preamble even when unable to correctly decode the remainder of an IEEE Standard 802.11ac packet.

In some examples, a receiving apparatus may distinguish between the first Wi-Fi packet 405, the second Wi-Fi packet 430, and/or the third Wi-Fi packet 460, and/or distinguish between an IEEE Standard 802.11a preamble, an IEEE Standard 802.11n preamble, and an IEEE Standard 802.11ac preamble by detecting a rotation (or non-rotation) of the constellation(s) of one or more symbols with respect to the constellation(s) of one or more other symbols. For example, the L-STFs 410, the L-LTFs 415, the L-SIGs 420, and the VHT-SIG-A1 465 may be transmitted using binary phase shift keying (BPSK) without rotated constellations, and the HT-SIG1 435, the HT-SIG2 440, and the VHT-SIG-A2 470 may be transmitted using BPSK with constellations having a 90° rotation. The remaining symbols of each of the first Wi-Fi packet 405, the second Wi-Fi packet 430, and the third Wi-Fi packet 460, and of the IEEE Standard 802.11n preamble, and IEEE Standard 802.11ac preamble, may be transmitted as a function of signal bandwidth.

Because the first Wi-Fi packet 405, the second Wi-Fi packet 430, and/or the third Wi-Fi packet 460 (and/or the IEEE Standard 802.11a preamble, the IEEE Standard 802.11n preamble, and the IEEE Standard 802.11ac preamble) may be distinguished by detecting a rotation (or non-rotation) of the constellations of the sixth symbol and the seventh symbol of a Wi-Fi packet and/or Wi-Fi preamble, it may be useful to format a channel occupancy identifier to include the first seven symbols (e.g., the first 28 μs) of a Wi-Fi packet and/or Wi-Fi preamble. This may enable a receiving apparatus capable of decoding an IEEE Standard 802.11ac preamble to correctly set a network allocation vector (NAV) by correctly interpreting the 12-bit length field of the L-SIGs 420 as a number of OFDM symbol periods or a number of bytes.

At the MAC layer, the receipt of a channel occupancy identifier formatted to include an IEEE Standard 802.11ac preamble may cause a Wi-Fi node (e.g., a Wi-Fi access point and/or a Wi-Fi station) configured to receive IEEE Standard 802.11ac packets to interpret the 12-bit length field of the third L-SIG 420-*c* in the IEEE Standard 802.11ac preamble as an indicator of a number of OFDM symbol periods. The same channel occupancy identifier may cause a Wi-Fi node configured to receive IEEE Standard 802.11a packets and/or IEEE Standard 802.11n packets, but not IEEE Standard 802.11ac packets, to interpret the 12-bit length field of the third L-SIG 420-*c* as an indicator of a number of bytes. The latter Wi-Fi node may therefore interpret the 12-bit length field of the third L-SIG 420-*c* incorrectly, but nonetheless determine that a channel of an unlicensed radio frequency spectrum band corresponding to the channel occupancy identifier has been reserved by another apparatus. A base station or UE communicating over the unlicensed radio frequency spectrum band may in some examples be configured to ignore the channel occupancy identifier. In other examples, a base station and/or UE communicating over the unlicensed radio frequency spectrum band may be configured to decode the channel occupancy identifier and determine that the channel of the unlicensed radio frequency spectrum band corresponding to the channel occupancy identifier has been reserved by another apparatus. In some examples, the channel occupancy identifier may include a number of bits to indicate whether the channel occupancy identifier was transmitted by a cellular node (e.g., a base station or a UE of a cellular network) or a Wi-Fi node. In some examples, the number of bits may include a number of bits (e.g., three reserved bits) in the VHT-SIG-A1 465 and VHT-SIG-A2 470 of the channel occupancy identifier. In some examples, a cellular node may refrain from accessing the channel of the unlicensed radio frequency spectrum band corresponding to the channel occupancy identifier when the cellular node determines that the channel occupancy identifier was transmitted by a Wi-Fi node, and ignore the channel occupancy identifier when the cellular node determines that the channel occupancy identifier was transmitted by another cellular node.

The transmission of a channel occupancy identifier by a cellular node may mitigate Wi-Fi starvation by alerting a Wi-Fi node to the fact that a channel of the unlicensed radio frequency spectrum band has already been reserved, thereby causing the Wi-Fi node to refrain from accessing the channel and possibly failing to successfully contend for access to the channel (which failure may cause the Wi-Fi node to increase a contention window size (e.g., double a contention window size) and refrain from accessing the channel for a longer period of time). If, however, a Wi-Fi node contends for access to the channel of the unlicensed radio frequency spectrum band before receiving, decoding, and/or processing the channel occupancy identifier, Wi-Fi starvation may still occur (e.g., the Wi-Fi node may fail to successfully contend for access to the channel and increase the contention window size).

In some examples, Wi-Fi starvation may be further mitigated by having a cellular node refrain from contending for access to a channel of an unlicensed radio frequency spectrum band upon receiving, decoding, and processing a channel occupancy identifier transmitted by a Wi-Fi node, and/or by implementing a probabilistic channel access mechanism wherein a cellular node begins a transmission, upon successfully contending for access the channel of the unlicensed radio frequency spectrum band, with a probability that is a function of an average detected energy on the channel.

When a plurality of transmitting apparatuses transmit a channel occupancy identifier at the same time (e.g., when a plurality of base stations of a public land mobile network (PLMN) transmit a channel occupancy identifier at the same time, or when a plurality of UEs in a cell transmit a channel occupancy identifier at the same time), a Wi-Fi access point and/or Wi-Fi station may receive the simultaneously transmitted channel occupancy identifiers as a combined channel occupancy identifier. When each of the simultaneously transmitted channel occupancy identifiers is formatted, for example, to include the first 28 μs of an IEEE Standard 802.11ac preamble, the first 16 μs (e.g., the L-STFs 410 and the L-LTFs 415) may include the same information, but the latter 12 μs (e.g., the third L-SIG 420-*c*, the VHT-SIG-A1s 465, and the VHT-SIG-A2s 470) may include different information. For example, the third L-SIG 420-*c* may include different information because different transmitting apparatuses may be operating under different TDD configurations, varying unlicensed radio frequency spectrum band reservations times, etc.

Because of the delay spread between a receiving apparatus' receipt of different simultaneously transmitted channel occupancy identifiers, and because of a potentially large cyclic prefix (CP) (e.g., 8 µs), single frequency network (SFN) channel estimates based on the received L-STFs 410 and L-LTFs 415 may be insufficient (e.g., the SFN channel estimates may be mismatched), and a proper decoding of the L-SIGs 420 may not be feasible. To improve decoding, different transmitting apparatuses may be configured to time-dither their respective transmissions of channel occupancy identifiers.

Figure 5:
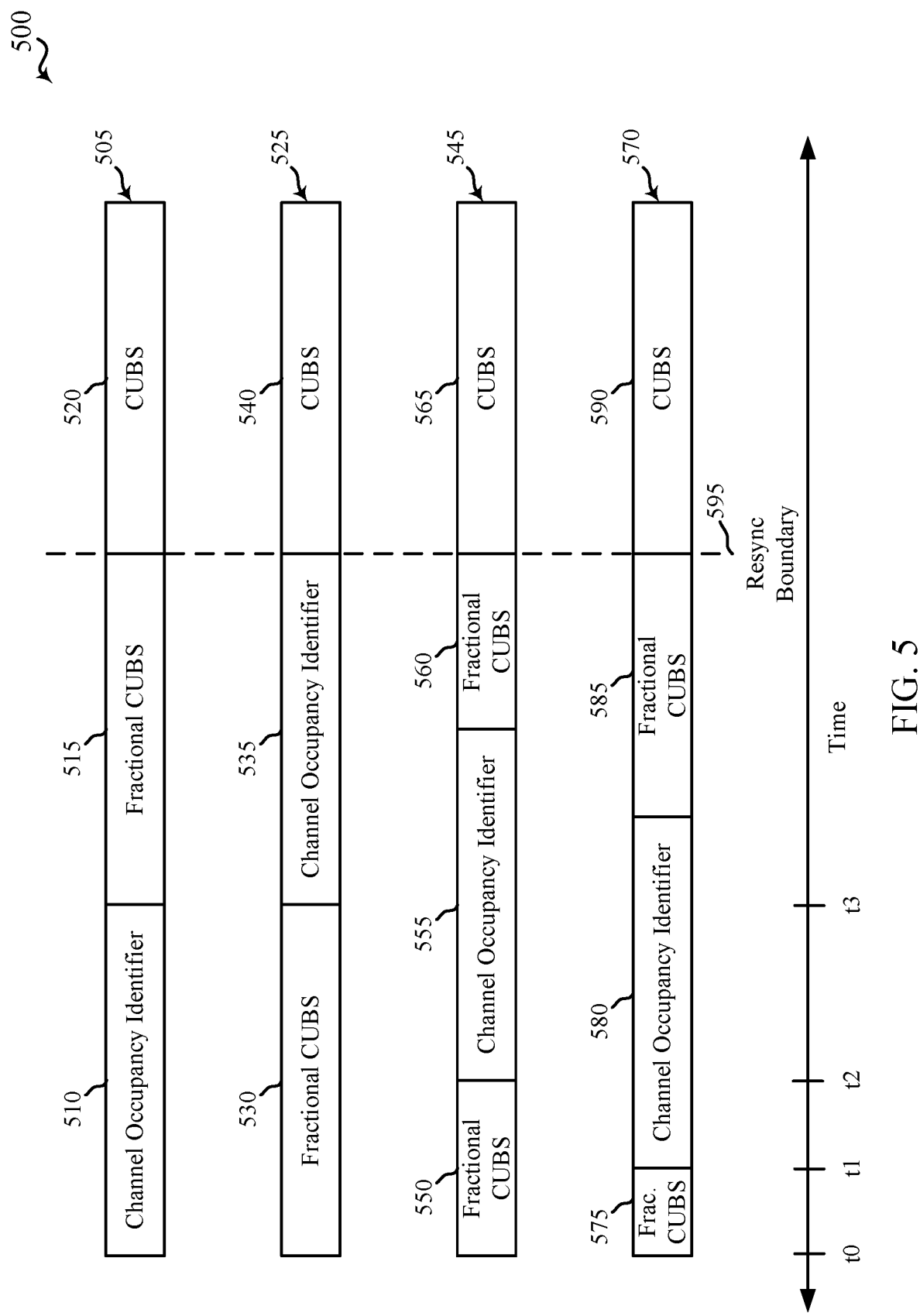
FIG. 5 shows an example of time-dithered transmissions of channel occupancy identifiers by a plurality of transmitting apparatuses, in accordance with various aspects of the present disclosure.

FIG. 5 shows an example 500 of time-dithered transmissions of channel occupancy identifiers by a plurality of transmitting apparatuses, in accordance with various aspects of the present disclosure. In some examples, a first transmission 505 may be made over an unlicensed radio frequency spectrum band by a first transmitting apparatus, a second transmission 525 may be made over the unlicensed radio frequency spectrum band by a second transmitting apparatus, a third transmission 545 may be made over the unlicensed radio frequency spectrum band by a third transmitting apparatus, and a fourth transmission 570 may be made over the unlicensed radio frequency spectrum band by a fourth transmitting apparatus. In some examples, each of the first transmitting apparatus, the second transmitting apparatus, the third transmitting apparatus, and the fourth transmitting apparatus may be an example of aspects of one or more of the base stations 105, 105-*a*, 205, and/or 205-*a* described with reference to FIGS. 1 and/or 2, or an example of aspects of one or more of the UEs 115, 115-*a*, 215, 215-*a*, 215-*b*, and/or 215-*c* described with reference to FIGS. 1 and/or 2. In some examples, the unlicensed radio frequency spectrum band may include a radio frequency spectrum band for which transmitting apparatuses may contend for access because the radio frequency spectrum band is available for unlicensed use, such as Wi-Fi use.

In some examples, each of the first transmission 505, the second transmission 525, the third transmission 545, and the fourth transmission 570 may include a transmission of one or more fractional CUBS, a channel occupancy identifier, and/or a CUBS. In some examples, the each of the first channel occupancy identifier 510, the second channel occupancy identifier 535, the third channel occupancy identifier 555, and the fourth channel occupancy identifier 580 may be an example of the channel occupancy identifier 350 and/or 375 described with reference to FIG. 3, and each of the first CUBS 520, the second CUBS 540, the third CUBS 565, and the fourth CUBS 590 may be an example of the D-CUBS 355 or the U-CUBS 380 described with reference to FIG. 3. The resynchronization boundary 595 may be an example of the downlink resynchronization boundary 387 or the uplink resynchronization boundary 392 described with reference to FIG. 3. As shown, at least some of the transmissions occurring prior to the resynchronization boundary 595 may be out-of-sync, and the transmissions occurring after the resynchronization boundary 595 may be in sync.

In some examples, the first transmission 505 may include a first channel occupancy identifier 510, a first fractional CUBS 515, and/or a first CUBS 520, and the first channel occupancy identifier 510 may be transmitted at a time t0. The second transmission 525 may include a second channel occupancy identifier 535, a second fractional CUBS 530, and/or a second CUBS 540, and the second channel occupancy identifier 535 may be transmitted at a time t3. The third transmission 545 may include a third channel occupancy identifier 555, a third fractional CUBS 550, a fourth fractional CUBS 560, and/or a third CUBS 565, and the third channel occupancy identifier 555 may be transmitted at a time t2. The fourth transmission 570 may include a fourth channel occupancy identifier 580, a fifth fractional CUBS 575, a sixth fractional CUBS 585, and/or a fourth CUBS 590, and the fourth channel occupancy identifier 580 may be transmitted at a time t1.

The time-dithering of channel occupancy identifier transmissions can have various effects on SFN transmission. For example, the time-dithering of channel occupancy identifiers may adversely affect the signal-to-noise ratio (SNR) on a channel, but may improve a receiving apparatus' ability to decode the first transmission 505, the second transmission 525, the third transmission 545, and/or the fourth transmission 570.

When time-dithering is used in conjunction with channel occupancy identifiers formatted according to IEEE Standard 802.11 preamble types, it may be useful to provide at least an 8 µs spacing between time-dithered transmission times (e.g., the duration of the L-STFs 410 or the L-LTFs 415), to mitigate SFN channel estimate interference.

In some examples, a transmission time for a transmitting apparatus' transmission of a channel occupancy identifier may be selected from among a plurality of possible transmission times based at least in part on a cell identifier (e.g., a cell ID) and/or based at least in part on a PLMN identifier.

Figure 6:
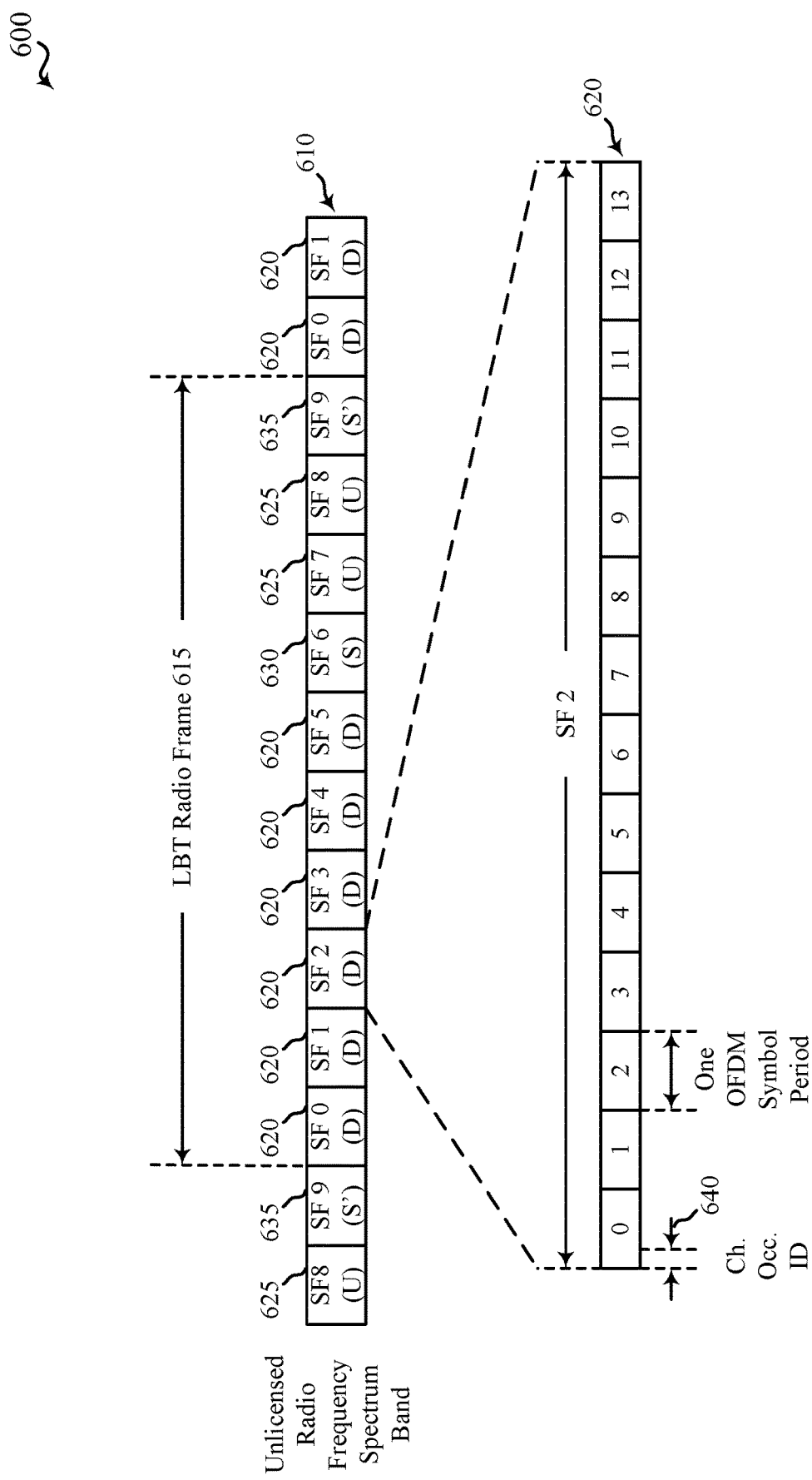
FIG. 6 shows an example of a wireless communication over an unlicensed radio frequency spectrum band, in accordance with various aspects of the present disclosure.

FIG. 6 shows an example 600 of a wireless communication 610 over an unlicensed radio frequency spectrum band, in accordance with various aspects of the present disclosure. In some examples, an LBT radio frame 615 may have a duration of ten milliseconds and include a number of downlink (D) subframes 620, a number of uplink (U) subframes 625, and two types of special subframes, an S subframe 630 and an S' subframe 635. The S subframe 630 may provide a transition between downlink (D) subframes 620 and uplink (U) subframes 625, while the S' subframe 635 may provide a transition between uplink (U) subframes 625 and downlink (D) subframes 620. In some examples, the unlicensed radio frequency spectrum band may include a radio frequency spectrum band for which transmitting apparatuses may contend for access because the radio frequency spectrum band is available for unlicensed use, such as Wi-Fi use.

In some examples, the downlink (D) subframes 620, the uplink (U) subframes 625, the S subframe 630, and the S' subframes 635 may be configured similarly to the downlink (D) subframes 320, the uplink (U) subframes 325, the S subframe 330, and the S' subframes 335 described with reference to FIG. 3. In some examples, a channel occupancy identifier similar to the channel occupancy identifier 350 may be transmitted by a transmitting apparatus (e.g., a base station such as one of the base stations 105, 105-*a*, 205, and/or 205-*a* described with reference to FIGS. 1 and/or 2) during one or more of the S' subframes 635, and/or a channel occupancy identifier similar to the channel occupancy identifier 375 may be transmitted by a transmitting apparatus (e.g., a UE such as one of the UEs 115, 115-*a*, 215, 215-*a*, 215-*b*, and/or 215-*c* described with reference to FIGS. 1 and/or 2) during the S subframe 630.

In some examples, a receiving apparatus such as a Wi-Fi access point (e.g., one of the Wi-Fi access points 135, 135-*a* described with reference to FIG. 1) and/or a Wi-Fi station (e.g., one of the Wi-Fi stations 140, 140-*a* described with reference to FIG. 1) may not detect or properly decode a transmission of a channel occupancy identifier. A transmitting apparatus may therefore transmit one or more additional instances of the channel occupancy identifier by puncturing a downlink transmission or an uplink transmission. For example, FIG. 6 illustrates a puncturing of the downlink transmission in subframe SF 2 to transmit an additional instance 640 of a channel occupancy identifier transmitted during an S' subframe 635. The additional instance 640 of the channel occupancy identifier may in some examples be transmitted in a first OFDM symbol period (e.g., OFDM symbol period 0) of the subframe SF 2.

Figure 7:
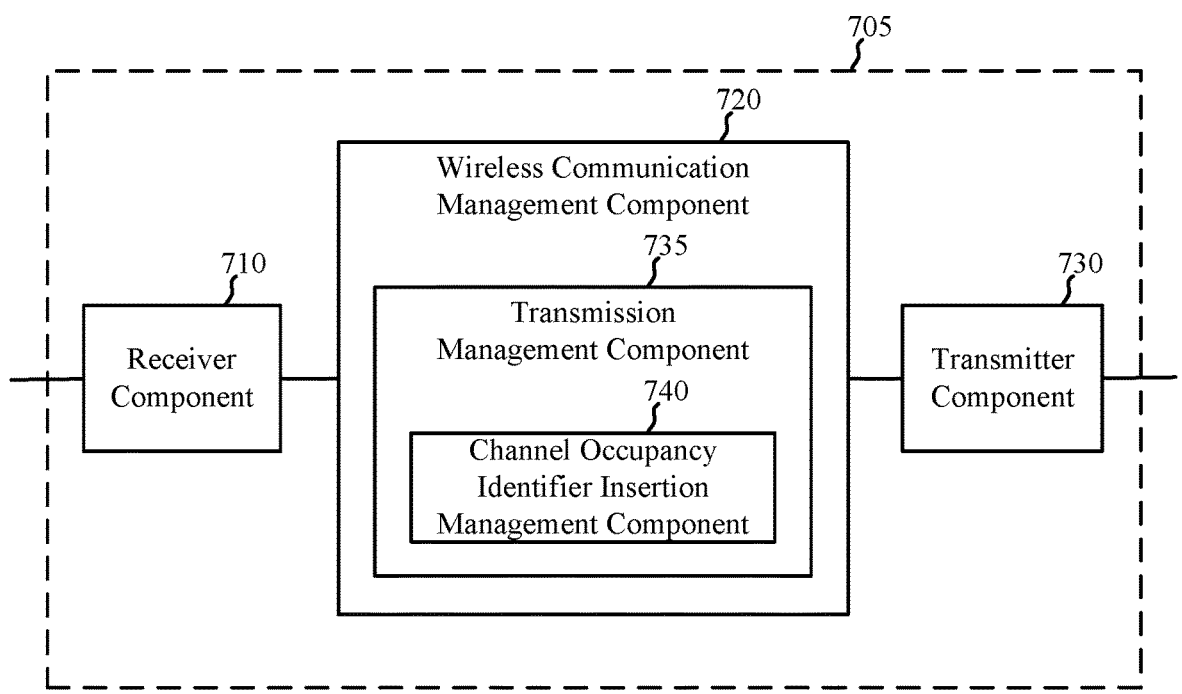
FIG. 7 shows a block diagram of a transmitting apparatus for use in wireless communication, in accordance with various aspects of the present disclosure.

FIG. 7 shows a block diagram 700 of a transmitting apparatus 705 for use in wireless communication, in accordance with various aspects of the present disclosure. The transmitting apparatus 705 may be an example of aspects of one or more of the base stations 105, 105-*a*, 205, and/or 205-*a* described with reference to FIGS. 1 and/or 2, and/or aspects of one or more of the UEs 115, 115-*a*, 215, 215-*a*, 215-*b*, and/or 215-*c* described with reference to FIGS. 1 and/or 2. The transmitting apparatus 705 may also be or include a processor. The transmitting apparatus 705 may include a receiver component 710, a wireless communication management component 720, and/or a transmitter component 730. Each of these components may be in communication with each other.

The components of the transmitting apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. The memory may be an on-board memory, a separate memory, or a combination thereof.

In some examples, the receiver component 710 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to users (e.g., LTE/LTE-A users), such as a licensed radio frequency spectrum band usable for LTE/LTE-A communications) and/or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 710 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 730 may include at least one RF transmitter, such as at least one RF transmitter operable to transmit over the licensed radio frequency spectrum band and/or the unlicensed radio frequency spectrum band. The transmitter component 730 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 720 may be used to manage one or more aspects of wireless communication for the transmitting apparatus 705. In some examples, the wireless communication management component 720 may include a transmission management component 735.

In some examples, the transmission management component 735 be used to format a first transmission using a first RAT. In some examples, the transmission management component 735 may include a channel occupancy identifier insertion management component 740. In some examples, the channel occupancy identifier insertion management component 740 may be used to insert, in the first transmission, a channel occupancy identifier for a second transmission using a second RAT. In some examples, the first RAT may be a cellular RAT and the second RAT may be a Wi-Fi RAT.

In some examples, the channel occupancy identifier may identify a duration (e.g., a backoff period) for which the unlicensed radio frequency spectrum band is reserved. In some examples, the duration may include a number of OFDM symbol periods and/or a number of bytes.

In some examples, the wireless communication management component 720 may be used to format the channel occupancy identifier. In some examples, the channel occupancy identifier may be formatted to include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In some examples, the transmission management component 735 may also be used to transmit the first transmission having the channel occupancy identifier over the unlicensed radio frequency spectrum band. In some examples, the first transmission having the channel occupancy identifier may be transmitted via the transmitter component 730.

Figure 8:
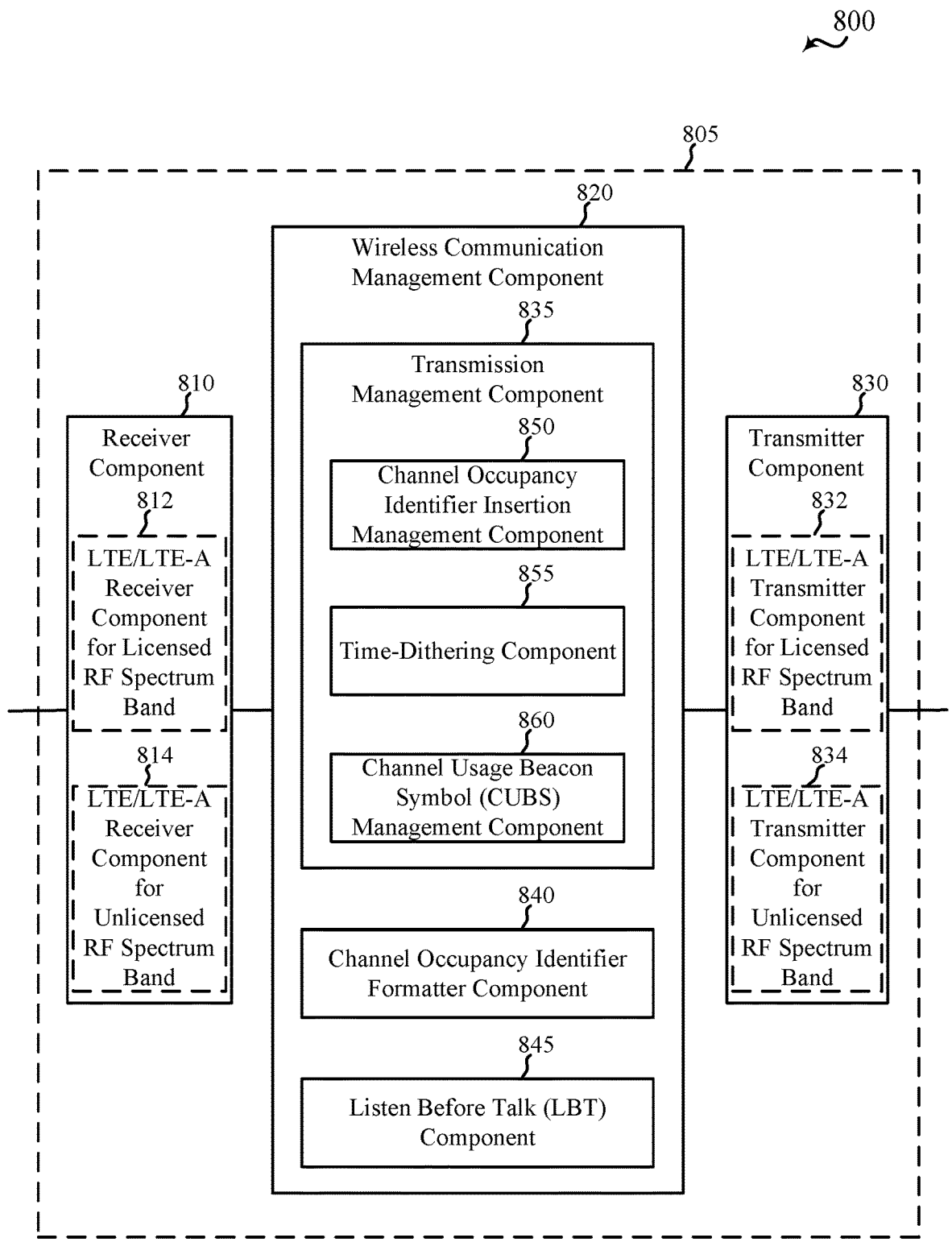
FIG. 8 shows a block diagram of a transmitting apparatus for use in wireless communication, in accordance with various aspects of the present disclosure.

FIG. 8 shows a block diagram 800 of a transmitting apparatus 805 for use in wireless communication, in accordance with various aspects of the present disclosure. The transmitting apparatus 805 may be an example of aspects of one or more of the base stations 105, 105-*a*, 205, and/or 205-*a* described with reference to FIGS. 1 and/or 2, aspects of one or more of the UEs 115, 115-*a*, 215, 215-*a*, 215-*b*, and/or 215-*c* described with reference to FIGS. 1 and/or 2, and/or aspects of the transmitting apparatus 705 described with reference to FIG. 7. The transmitting apparatus 805 may also be or include a processor. The transmitting apparatus 805 may include a receiver component 810, a wireless communication management component 820, and/or a transmitter component 830. Each of these components may be in communication with each other.

The components of the transmitting apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. The memory may be an on-board memory, a separate memory, or a combination thereof.

In some examples, the receiver component 810 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to users (e.g., LTE/LTE-A users) such as a licensed radio frequency spectrum band usable for LTE/LTE-A communications) and/or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 810 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 812), and an LTE/LTE-A receiver component for communicating over the unlicensed radio frequency spectrum band (e.g., LTE/LTE-A receiver component for unlicensed RF spectrum band 814). The receiver component 810, including the LTE/LTE-A receiver component for licensed RF spectrum band 812 and/or the LTE/LTE-A receiver component for unlicensed RF spectrum band 814, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 830 may include at least one RF transmitter, such as at least one RF transmitter operable to transmit over the licensed radio frequency spectrum band and/or the unlicensed radio frequency spectrum band. The transmitter component 830 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 832), and an LTE/LTE-A transmitter component for communicating over the unlicensed radio frequency spectrum band (e.g., LTE/LTE-A transmitter component for unlicensed RF spectrum band 834). The transmitter component 830, including the LTE/LTE-A transmitter component for licensed RF spectrum band 832 and/or the LTE/LTE-A transmitter component for unlicensed RF spectrum band 834, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 820 may be used to manage one or more aspects of wireless communication for the transmitting apparatus 805. In some examples, the wireless communication management component 820 may include a transmission management component 835, a channel occupancy identifier formatter component 840, and/or an LBT component 845.

In some examples, the transmission management component 835 be used to format a first transmission using a first RAT. In some examples, the transmission management component 835 may include a channel occupancy identifier insertion management component 850. In some examples, the channel occupancy identifier insertion management component 850 may be used to insert, in the first transmission, a channel occupancy identifier for a second transmission using a second RAT. In some examples, the first RAT may be a cellular RAT and the second RAT may be a Wi-Fi RAT.

In some examples, the channel occupancy identifier may identify a duration (e.g., a backoff period) for which the unlicensed radio frequency spectrum band is reserved. In some examples, the duration may include a number of OFDM symbol periods and/or a number of bytes.

In some examples, the channel occupancy identifier insertion management component 850 may insert the channel occupancy identifier in the first transmission by inserting the channel occupancy identifier to precede a first data subframe of the first transmission. In some examples, the channel occupancy identifier insertion management component 850 may insert the channel occupancy identifier in the first transmission by inserting the channel occupancy identifier in a data subframe of the first transmission. In some examples, the channel occupancy identifier insertion management component 850 may insert the channel occupancy identifier in the first transmission by inserting a first instance of the channel occupancy identifier and a second instance of the channel occupancy identifier in the first transmission. In some examples, the first instance of the channel occupancy identifier may be inserted to precede a first data subframe of the first transmission, and the second instance of the channel occupancy identifier may be inserted in a data subframe of the first transmission.

In some examples, the channel occupancy identifier formatter component 840 may format the channel occupancy identifier to include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In examples in which a channel occupancy identifier is formatted to include at least a portion of a Wi-Fi preamble, the Wi-Fi preamble may include at least a first symbol and a second symbol, and the channel occupancy identifier formatter component 840 may be used to format the Wi-Fi preamble by rotating a second constellation of the second symbol with respect to a first constellation of the first symbol. The rotation (or non-rotation) of the second constellation may indicate, at least in part, a Wi-Fi preamble type to which the channel occupancy identifier corresponds. For example, the rotation of the second constellation may indicate whether the channel occupancy identifier corresponds to a IEEE Standard 802.11ac preamble. In some examples, the Wi-Fi preamble type to which the channel occupancy identifier corresponds may be used to interpret a backoff period indicated by the channel occupancy identifier (e.g., to determine whether the backoff period is specified as a number of OFDM symbol periods and/or a number of bytes).

In some examples, the LBT component 845 may be used to perform an LBT procedure to contend for access to an unlicensed radio frequency spectrum band. When it is determined that contention to access the unlicensed radio frequency spectrum band has been won, the transmission management component 835 may be allowed to transmit the first transmission having the channel occupancy identifier over the unlicensed radio frequency spectrum band. When it is determined that contention to access the unlicensed radio frequency spectrum band has not been won, the LBT procedure may be repeated. In some examples, the LBT procedure may be repeated after a delay (e.g., at a scheduled time for performing a next LBT procedure).

In some examples, the transmission management component 835 may be used to transmit the first transmission having the channel occupancy identifier over the unlicensed radio frequency spectrum band (e.g., when allowed to transmit by the LBT component 845). In some examples, the first transmission having the channel occupancy identifier may be transmitted via the LTE/LTE-A transmitter component for unlicensed RF spectrum band 834 of the transmitter component 830. In some examples, transmission of the first transmission having the channel occupancy identifier may depend on a timing of a resynchronization boundary (e.g., a timing of the downlink resynchronization boundary 387 or the uplink resynchronization boundary 392 described with reference to FIG. 3). For example, the transmission management component 835 may determine whether a resynchronization boundary of a current transmission time interval has passed, and when the resynchronization boundary has not passed, the transmission management component 835 may be used to transmit the first transmission having the channel occupancy identifier. When the resynchronization boundary has passed, the transmission management component 835 may be used to transmit the first transmission without the channel occupancy identifier.

In some examples, the transmission management component 835 may include a time-dithering component 855. In some examples, the time-dithering component 855 may be used to time-dither a transmission time of the channel occupancy identifier over the unlicensed radio frequency spectrum band. In some examples, the time-dithering component 855 may select a time-dithered transmission time for the channel occupancy identifier. The transmission time may be selected, for example, based at least in part on a cell identifier (e.g., a cell ID) and/or based at least in part on a PLMN identifier.

In some examples, the transmission management component 835 may include a CUBS management component 860. In some examples, the CUBS management component 860 may be used to transmit the channel occupancy identifier as at least a portion of a CUBS, and the channel occupancy identifier may serve to reserve part or all of the unlicensed radio frequency spectrum band during its transmission over the unlicensed radio frequency spectrum band. In some examples, the portion of the CUBS may include at least a portion of a fractional CUBS.

Figure 9:
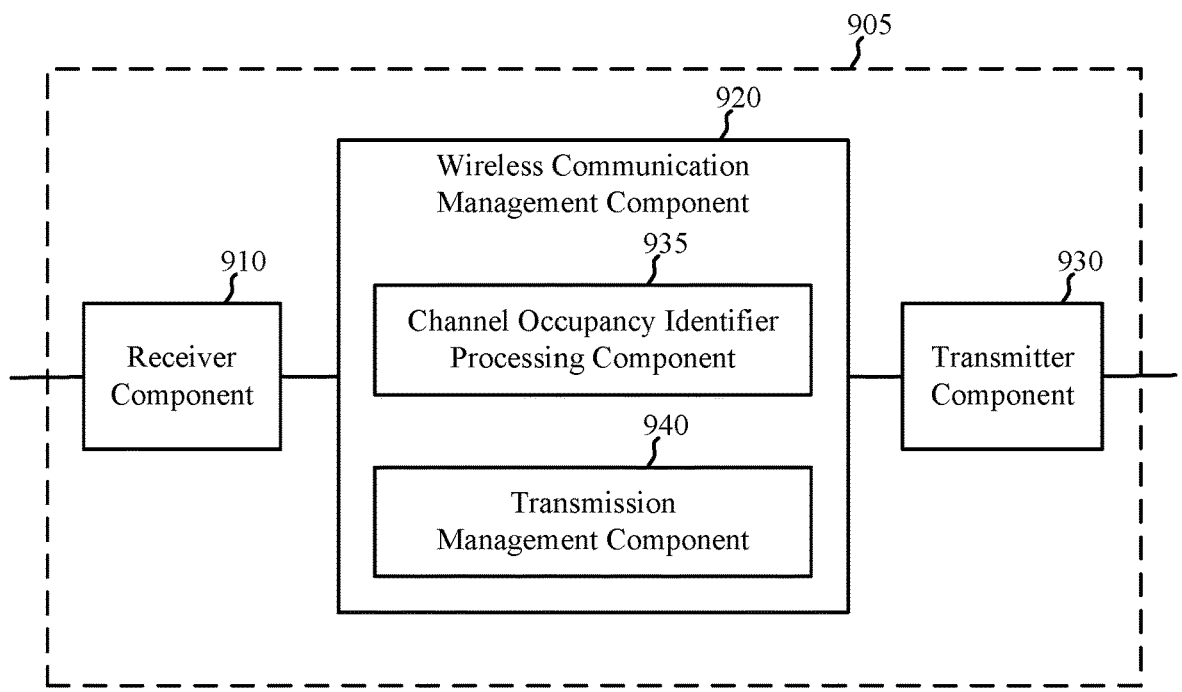
FIG. 9 shows a block diagram of a receiving apparatus for use in wireless communication, in accordance with various aspects of the present disclosure.

FIG. 9 shows a block diagram 900 of a receiving apparatus 905 for use in wireless communication, in accordance with various aspects of the present disclosure. The receiving apparatus 905 may be an example of aspects of one or more of the UEs 115, 115-*a*, 215, 215-*a*, 215-*b*, and/or 215-*c* described with reference to FIGS. 1 and/or 2, aspects of one or more of the base stations 105, 105-*a*, 205, and/or 205-*a* described with reference to FIGS. 1 and/or 2, aspects of one or more of the Wi-Fi access points 135 and/or 135-*a* described with reference to FIG. 1, and/or aspects of one or more of the Wi-Fi stations 140 and/or 140-*a* described with reference to FIG. 1. The receiving apparatus 905 may also be or include a processor. The receiving apparatus 905 may include a receiver component 910, a wireless communication management component 920, and/or a transmitter component 930. Each of these components may be in communication with each other.

The components of the receiving apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. The memory may be an on-board memory, a separate memory, or a combination thereof.

In some examples, the receiver component 910 may include at least one RF receiver. In examples in which the receiving apparatus 905 is an example of aspects of a UE or a base station, the receiver component 910 may include at least one RF receiver operable to receive transmissions over a licensed radio frequency spectrum band (e.g., a radio frequency spectrum band for which transmitting apparatuses may not contend for access because the radio frequency spectrum band is licensed to users (e.g., LTE/LTE-A users), such as a licensed radio frequency spectrum band usable for LTE/LTE-A communications) and/or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. In examples in which the receiving apparatus 905 is an example of aspects of a Wi-Fi access point or a Wi-Fi station, the receiver component 910 may include at least one RF receiver operable to receive transmissions over the unlicensed radio frequency spectrum band, which unlicensed radio frequency spectrum band may be used for Wi-Fi communications, as described, for example, with reference to FIG. 1. The receiver component 910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 930 may include at least one RF transmitter. In examples in which the receiving apparatus 905 is an example of aspects of a UE or a base station, the transmitter component 930 may include at least one RF transmitter operable to transmit over the licensed radio frequency spectrum band and/or the unlicensed radio frequency spectrum band. In examples in which the receiving apparatus 905 is an example of aspects of a Wi-Fi access point or a Wi-Fi station, the transmitter component 930 may include at least one RF transmitter operable to transmit over the unlicensed radio frequency spectrum band. The transmitter component 930 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 920 may be used to manage one or more aspects of wireless communication for the receiving apparatus 905. In some examples, the wireless communication management component 920 may include a channel occupancy identifier processing component 935 and/or a transmission management component 940. Operation of the channel occupancy identifier processing component 935 and transmission management component 940 are described below, first, in the context of a UE or base station, and second, in the context of a Wi-Fi access point or Wi-Fi station.

When the receiving apparatus 905 is an example of aspects of a UE or base station, and in some examples, the receiver component 910 and/or channel occupancy identifier processing component 935 may be used to receive a channel occupancy identifier for a transmission using a Wi-Fi RAT. The channel occupancy identifier may be received over an unlicensed radio frequency spectrum band using a receiver (e.g., a cellular receiver of the receiver component 910) using a cellular RAT.

In some examples, a received channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In some examples, the channel occupancy identifier may be received as at least a portion of a CUBS (e.g., the channel occupancy identifier may serve to reserve part or all of the unlicensed radio frequency spectrum band during its transmission over the unlicensed radio frequency spectrum band). In some examples, the portion of the CUBS may include at least a portion of a fractional CUBS.

When the receiving apparatus 905 is an example of aspects of a UE or base station, and in some examples, the receiver component 910 and/or channel occupancy identifier processing component 935 may be used to decode the channel occupancy identifier to identify a backoff period. In some examples, the backoff period may include a number of OFDM symbol periods and/or a number of bytes.

In some examples, an indication of whether the channel occupancy identifier was transmitted by a transmitter using the first RAT or a transmitter using the second RAT may be encoded in a number of bits of the channel occupancy identifier, such as a number of reserved bits (e.g., three bits) of the VHT-SIG-A1 465 and VHT-SIG-A2 470 described with reference to the third Wi-Fi packet 460 described with reference to FIG. 4. In these and other examples, the receiver component 910 and/or channel occupancy identifier processing component 935 may decode the channel occupancy identifier to determine whether the channel occupancy identifier was received from the transmitter using the cellular RAT (e.g., a transmitter of a UE or base station of a cellular network) or the transmitter using the Wi-Fi RAT (e.g., a transmitter of a Wi-Fi access point or Wi-Fi station).

In some examples, the channel occupancy identifier may include at least a first symbol and a second symbol, and the receiver component 910 and/or channel occupancy identifier processing component 935 may decode the channel occupancy identifier to detect a rotation (or non-rotation) of a second constellation of the second symbol with respect to a first constellation of the first symbol. The detected rotation (or non-rotation) of the second constellation may indicate, at least in part, a Wi-Fi preamble type to which the channel occupancy identifier corresponds. For example, the detected rotation (or non-rotation) of the second constellation may indicate whether the channel occupancy identifier corresponds to an IEEE Standard 802.11ac preamble. In some examples, the Wi-Fi preamble type to which the channel occupancy identifier corresponds may be used to interpret the backoff period indicated by the channel occupancy identifier (e.g., to determine whether the backoff period is specified as a number of OFDM symbol periods and/or a number of bytes).

When the receiving apparatus 905 is an example of aspects of a UE or base station, and in some examples, the transmission management component 940 may be used to configure the receiving apparatus 905 to refrain from accessing the unlicensed radio frequency spectrum band using the cellular RAT based at least in part on the backoff period identified by the channel occupancy identifier processing component 935.

Turning now to the context of a Wi-Fi access point or Wi-Fi station, when the receiving apparatus 905 is an example of aspects of a Wi-Fi access point or Wi-Fi station, and in some examples, the receiver component 910 and/or channel occupancy identifier processing component 935 may be used to receive a channel occupancy identifier for a transmission using a Wi-Fi RAT. The channel occupancy identifier may be received over an unlicensed radio frequency spectrum band using a receiver (e.g., a Wi-Fi receiver of the receiver component 910) using the Wi-Fi RAT.

In some examples, a received channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

When the receiving apparatus 905 is an example of aspects of a Wi-Fi access point or Wi-Fi station, and in some examples, the receiver component 910 and/or channel occupancy identifier processing component 935 may be used to decode the channel occupancy identifier to identify a backoff period. In some examples, the backoff period may include a number of OFDM symbol periods and/or a number of bytes.

In some examples, the channel occupancy identifier may include at least a first symbol and a second symbol, and the receiver component 910 and/or channel occupancy identifier processing component 935 may decode the channel occupancy identifier to detect a rotation (or non-rotation) of a second constellation of the second symbol with respect to a first constellation of the first symbol. The detected rotation (or non-rotation) of the second constellation may indicate, at least in part, a Wi-Fi preamble type to which the channel occupancy identifier corresponds. For example, the detected rotation (or non-rotation) of the second constellation may indicate whether the channel occupancy identifier corresponds to an IEEE Standard 802.11ac preamble. In some examples, the Wi-Fi preamble type to which the channel occupancy identifier corresponds may be used to interpret the backoff period indicated by the channel occupancy identifier (e.g., to determine whether the backoff period is specified as a number of OFDM symbol periods and/or a number of bytes).

When the receiving apparatus 905 is an example of aspects of a Wi-Fi access point or Wi-Fi station, and in some examples, the transmission management component 940 may be used to configure the receiving apparatus 905 to refrain from accessing the unlicensed radio frequency spectrum band using the Wi-Fi RAT based at least in part on the backoff period identified by the channel occupancy identifier processing component 935.

In some examples, the transmission management component 940 may refrain from increasing a contention window size (e.g., a time period for which the receiving apparatus 905 refrains from accessing the unlicensed radio frequency spectrum band following a failure to successfully contend for access to the unlicensed radio frequency spectrum band) upon identifying the backoff period.

Figure 10:
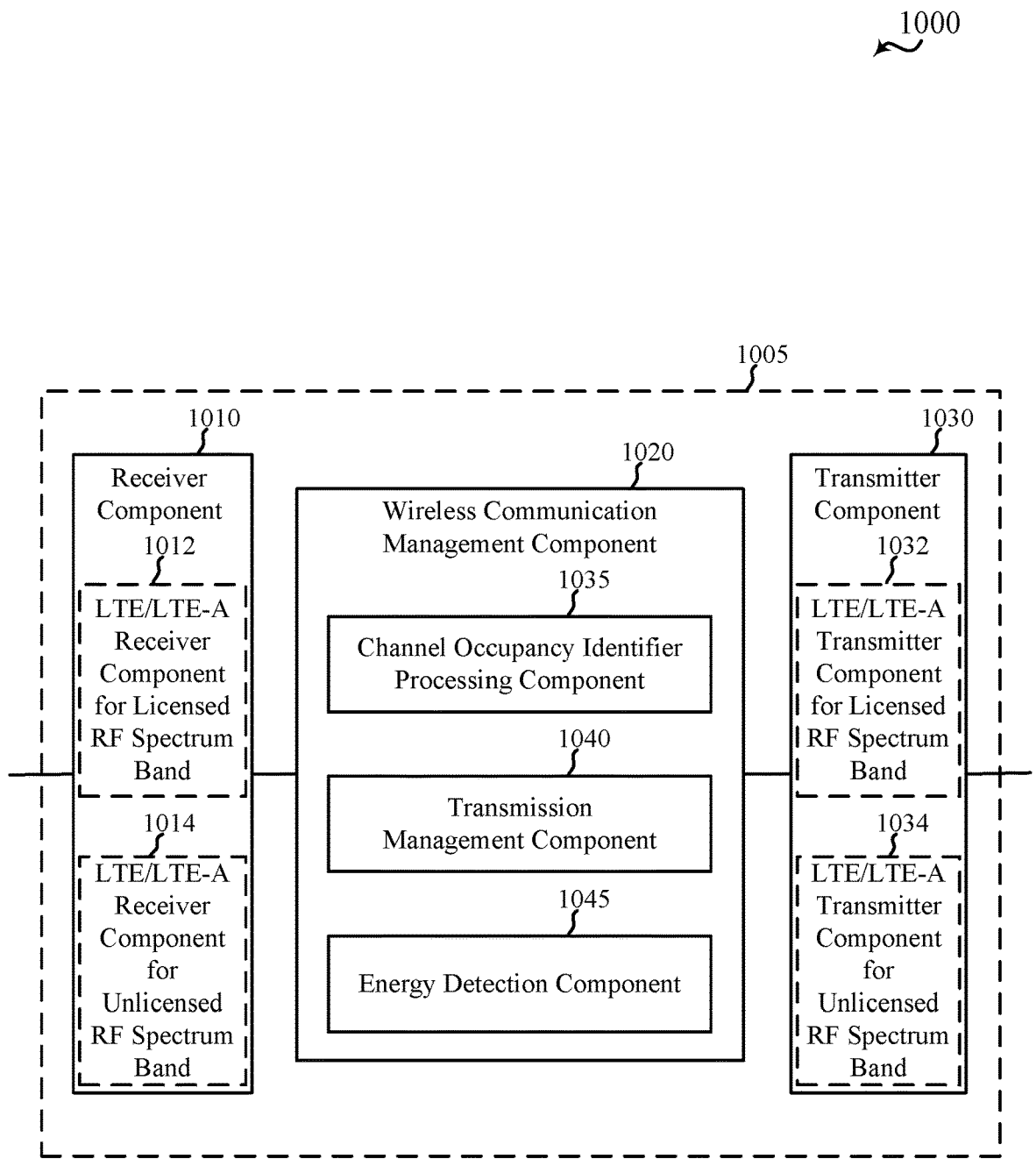
FIG. 10 shows a block diagram of a receiving apparatus for use in wireless communication, in accordance with various aspects of the present disclosure.

FIG. 10 shows a block diagram 1000 of a receiving apparatus 1005 for use in wireless communication, in accordance with various aspects of the present disclosure. The receiving apparatus 1005 may be an example of aspects of one or more of the UEs 115, 115-*a*, 215, 215-*a*, 215-*b*, and/or 215-*c* described with reference to FIGS. 1 and/or 2, aspects of one or more of the base stations 105, 105-*a*, 205, and/or 205-*a* described with reference to FIGS. 1 and/or 2, and/or aspects of the receiving apparatus 905 described with reference to FIG. 9. The receiving apparatus 1005 may also be or include a processor. The receiving apparatus 1005 may include a receiver component 1010, a wireless communication management component 1020, and/or a transmitter component 1030. Each of these components may be in communication with each other.

The components of the receiving apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. The memory may be an on-board memory, a separate memory, or a combination thereof.

In some examples, the receiver component 1010 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to users (e.g., LTE/LTE-A users), such as a licensed radio frequency spectrum band usable for LTE/LTE-A communications) and/or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver component 1010 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1012), and an LTE/LTE-A receiver component for communicating over the unlicensed radio frequency spectrum band (e.g., LTE/LTE-A receiver component for unlicensed RF spectrum band 1014). The receiver component 1010, including the LTE/LTE-A receiver component for licensed RF spectrum band 1012 and/or the LTE/LTE-A receiver component for unlicensed RF spectrum band 1014, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter component 1030 may include at least one RF transmitter, such as at least one RF transmitter operable to transmit over the licensed radio frequency spectrum band and/or the unlicensed radio frequency spectrum band. The transmitter component 1030 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1032), and an LTE/LTE-A transmitter component for communicating over the unlicensed radio frequency spectrum band (e.g., LTE/LTE-A transmitter component for unlicensed RF spectrum band 1034). The transmitter component 1030, including the LTE/LTE-A transmitter component for licensed RF spectrum band 1032 and/or the LTE/LTE-A transmitter component for unlicensed RF spectrum band 1034, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management component 1020 may be used to manage one or more aspects of wireless communication for the receiving apparatus 1005. In some examples, the wireless communication management component 1020 may include a channel occupancy identifier processing component 1035, a transmission management component 1040, and/or an energy detection component 1045.

In some examples, the receiver component 1010 and/or channel occupancy identifier processing component 1035 may be used to receive a channel occupancy identifier for a transmission using a Wi-Fi RAT. The channel occupancy identifier may be received over an unlicensed radio frequency spectrum band using a receiver (e.g., a cellular receiver of the receiver component 1010) using a cellular RAT.

In some examples, a received channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In some examples, the channel occupancy identifier may be received as at least a portion of a CUBS (e.g., the channel occupancy identifier may serve to reserve part or all of the unlicensed radio frequency spectrum band during its transmission over the unlicensed radio frequency spectrum band). In some examples, the portion of the CUBS may include at least a portion of a fractional CUBS.

In some examples, the receiver component 1010 and/or channel occupancy identifier processing component 1035 may be used to decode the channel occupancy identifier to identify a backoff period. In some examples, the backoff period may include a number of OFDM symbol periods and/or a number of bytes.

In some examples, an indication of whether the channel occupancy identifier was transmitted by a transmitter using the first RAT (e.g., a cellular RAT) or a transmitter using the second RAT (e.g., a Wi-Fi RAT) may be encoded in a number of bits of the channel occupancy identifier, such as a number of reserved bits (e.g., three bits) of the VHT-SIG-A1 465 and VHT-SIG-A2 470 described with reference to the third Wi-Fi packet 460 described with reference to FIG. 4. In these and other examples, the receiver component 1010 and/or channel occupancy identifier processing component 1035 may decode the channel occupancy identifier to determine whether the channel occupancy identifier was received from the transmitter using the cellular RAT (e.g., a transmitter of a UE or base station of a cellular network) or the transmitter using the Wi-Fi RAT (e.g., a transmitter of a Wi-Fi access point or Wi-Fi station).

In some examples, the channel occupancy identifier may include at least a first symbol and a second symbol, and the receiver component 1010 and/or channel occupancy identifier processing component 1035 may decode the channel occupancy identifier to detect a rotation (or non-rotation) of a second constellation of the second symbol with respect to a first constellation of the first symbol. The detected rotation (or non-rotation) of the second constellation may indicate, at least in part, a Wi-Fi preamble type to which the channel occupancy identifier corresponds. For example, the detected rotation (or non-rotation) of the second constellation may indicate whether the channel occupancy identifier corresponds to an IEEE Standard 802.11ac preamble. In some examples, the Wi-Fi preamble type to which the channel occupancy identifier corresponds may be used to interpret the backoff period indicated by the channel occupancy identifier (e.g., to determine whether the backoff period is specified as a number of OFDM symbol periods and/or a number of bytes).

In some examples, the transmission management component 1040 may be used to configure the receiving apparatus 1005 to refrain from accessing the unlicensed radio frequency spectrum band using the cellular RAT based at least in part on the backoff period identified by the channel occupancy identifier processing component 1035.

In some examples, the energy detection component 1045 may be used to detect an energy level of the unlicensed radio frequency spectrum band. In some examples, the transmission management component 1040 may be used to configure the receiving apparatus 1005 to refrain from accessing the unlicensed radio frequency spectrum band using the cellular RAT based at least in part on the detected energy level (e.g., to refrain from accessing the unlicensed radio frequency spectrum band when the detected energy level satisfies a threshold). In some examples, the transmission management component 1040 may be used to configure the receiving apparatus 1005 to refrain from accessing the unlicensed radio frequency spectrum band using the cellular RAT when the detected energy level fails to satisfy a threshold (e.g., to refrain from accessing the unlicensed radio frequency spectrum band when the detected energy level fails to satisfy a threshold but a received channel occupancy identifier identifies a backoff period).

Figure 11:
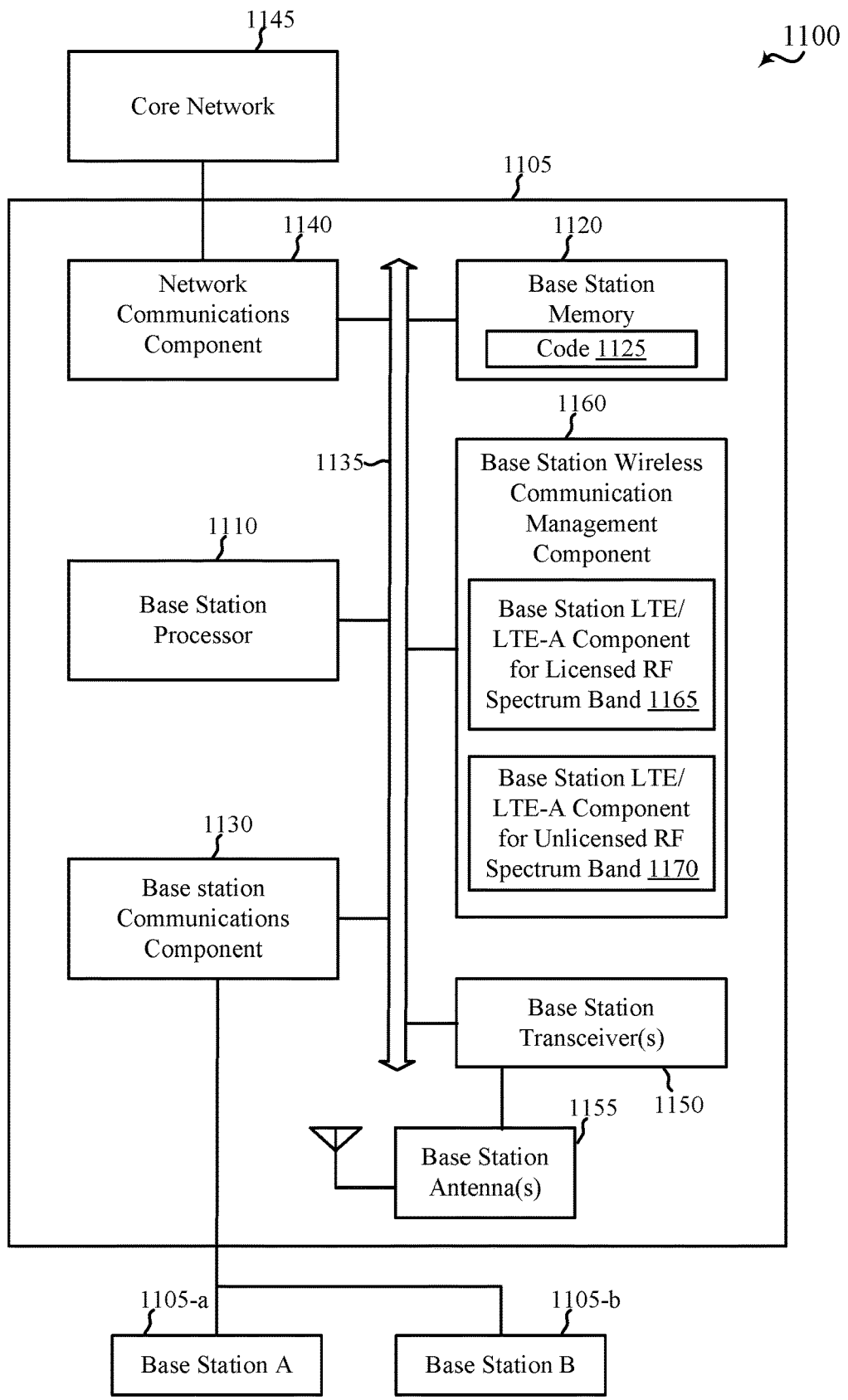
FIG. 11 shows a block diagram of a base station (e.g., a base station forming part or all of an eNB) for use in wireless communication, in accordance with various aspects of the present disclosure.

FIG. 11 shows a block diagram 1100 of a base station 1105 (e.g., a base station forming part or all of an eNB) for use in wireless communication, in accordance with various aspects of the present disclosure. In some examples, the base station 1105 may be an example of aspects of one or more of the base stations 105, 105-a, 205, and/or 205-a described with reference to FIGS. 1 and/or 2, aspects of one or more of the transmitting apparatuses 705 and/or 805 described with reference to FIGS. 7 and/or 8, and/or aspects of one or more of the receiving apparatuses 905 and/or 1005 described with reference to FIGS. 9 and/or 10. The base station 1105 may be configured to implement or facilitate at least some of the base station, transmitting apparatus, and/or receiving apparatus features and functions described with reference to FIGS. 1, 2, 3, 4, 5, 6, 7, 8, 9, and/or 10.

The base station 1105 may include a base station processor 1110, a base station memory 1120, at least one base station transceiver (represented by base station transceiver(s) 1150), at least one base station antenna (represented by base station antenna(s) 1155), and/or a base station wireless communication management component 1160. The base station 1105 may also include one or more of a base station communications component 1130 and/or a network communications component 1140. Each of these components may be in communication with each other, directly or indirectly, over one or more buses 1135.

The base station memory 1120 may include random access memory (RAM) and/or read-only memory (ROM). The base station memory 1120 may store computer-readable, computer-executable code 1125 containing instructions that are configured to, when executed, cause the base station processor 1110 to perform various functions described herein related to wireless communication, including the transmission and/or reception of a channel occupancy identifier. Alternatively, the computer-executable code 1125 may not be directly executable by the base station processor 1110 but be configured to cause the base station 1105 (e.g., when compiled and executed) to perform various of the functions described herein.

The base station processor 1110 may include an intelligent hardware device, e.g., a central processing unit (CPU), a microcontroller, an ASIC, etc. The base station processor 1110 may process information received through the base station transceiver(s) 1150, the base station communications component 1130, and/or the network communications component 1140. The base station processor 1110 may also process information to be sent to the transceiver(s) 1150 for transmission through the antenna(s) 1155, to the base station communications component 1130, for transmission to one or more other base stations (base station A 1105-*a* and base station B 1105-*b*), and/or to the network communications component 1140 for transmission to a core network 1145, which may be an example of one or more aspects of the core network 130 described with reference to FIG. 1. The base station processor 1110 may handle, alone or in connection with the base station wireless communication management component 1160, various aspects of communicating over (or managing communications over) a licensed radio frequency spectrum band (e.g., a radio frequency spectrum band for which transmitting apparatuses may not contend for access because the radio frequency spectrum band is licensed to users (e.g., LTE/LTE-A users), such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The base station transceiver(s) 1150 may include a modem configured to modulate packets and provide the modulated packets to the base station antenna(s) 1155 for transmission, and to demodulate packets received from the base station antenna(s) 1155. The base station transceiver(s) 1150 may, in some examples, be implemented as one or more base station transmitters and one or more separate base station receivers. The base station transceiver(s) 1150 may support communications in the licensed radio frequency spectrum band and/or the unlicensed radio frequency spectrum band. The base station transceiver(s) 1150 may be configured to communicate bi-directionally, via the antenna(s) 1155, with one or more UEs, such as one or more of the UEs 115, the first UE 215, the second UE 215-*a*, the third UE 215-*b*, and/or the fourth UE 215-*c* described with reference to FIGS. 1 and/or 2, and/or a UE including one or more of the transmitting apparatuses 705 and/or 805 described with reference to FIGS. 7 and/or 8 and/or one or more of the receiving apparatuses 905 and/or 1005 described with reference to FIGS. 9 and/or 10. The base station 1105 may, for example, include multiple base station antennas 1155 (e.g., an antenna array). The base station 1105 may communicate with the core network 1145 through the network communications component 1140. The base station 1105 may also communicate with other base stations, such as the base stations 1105-*a* and 1105-*b*, using the base station communications component 1130.

The base station wireless communication management component 1160 may be configured to perform and/or control some or all of the base station, transmitting apparatus, and/or receiving apparatus features and functions described with reference to FIGS. 1, 2, 3, 4, 5, 6, 7, 8, 9, and/or 10 related to wireless communication over a licensed radio frequency spectrum band and/or an unlicensed radio frequency spectrum band. For example, the base station wireless communication management component 1160 may be configured to support a supplemental downlink mode, a carrier aggregation mode, and/or a standalone mode using the licensed radio frequency spectrum band and/or the unlicensed radio frequency spectrum band. The base station wireless communication management component 1160 may include a base station LTE/LTE-A component for licensed RF spectrum band 1165 configured to handle LTE/LTE-A communications in the licensed radio frequency spectrum band, and a base station LTE/LTE-A component for unlicensed RF spectrum band 1170 configured to handle LTE/LTE-A communications in the unlicensed radio frequency spectrum band. The base station wireless communication management component 1160, or portions of it, may include a processor, and/or some or all of the functions of the base station wireless communication management component 1160 may be performed by the base station processor 1110 and/or in connection with the base station processor 1110. In some examples, the base station wireless communication management component 1160 may be an example of the wireless communication management component 720 and/or 820 described with reference to FIGS. 7 and/or 8.

Figure 12:
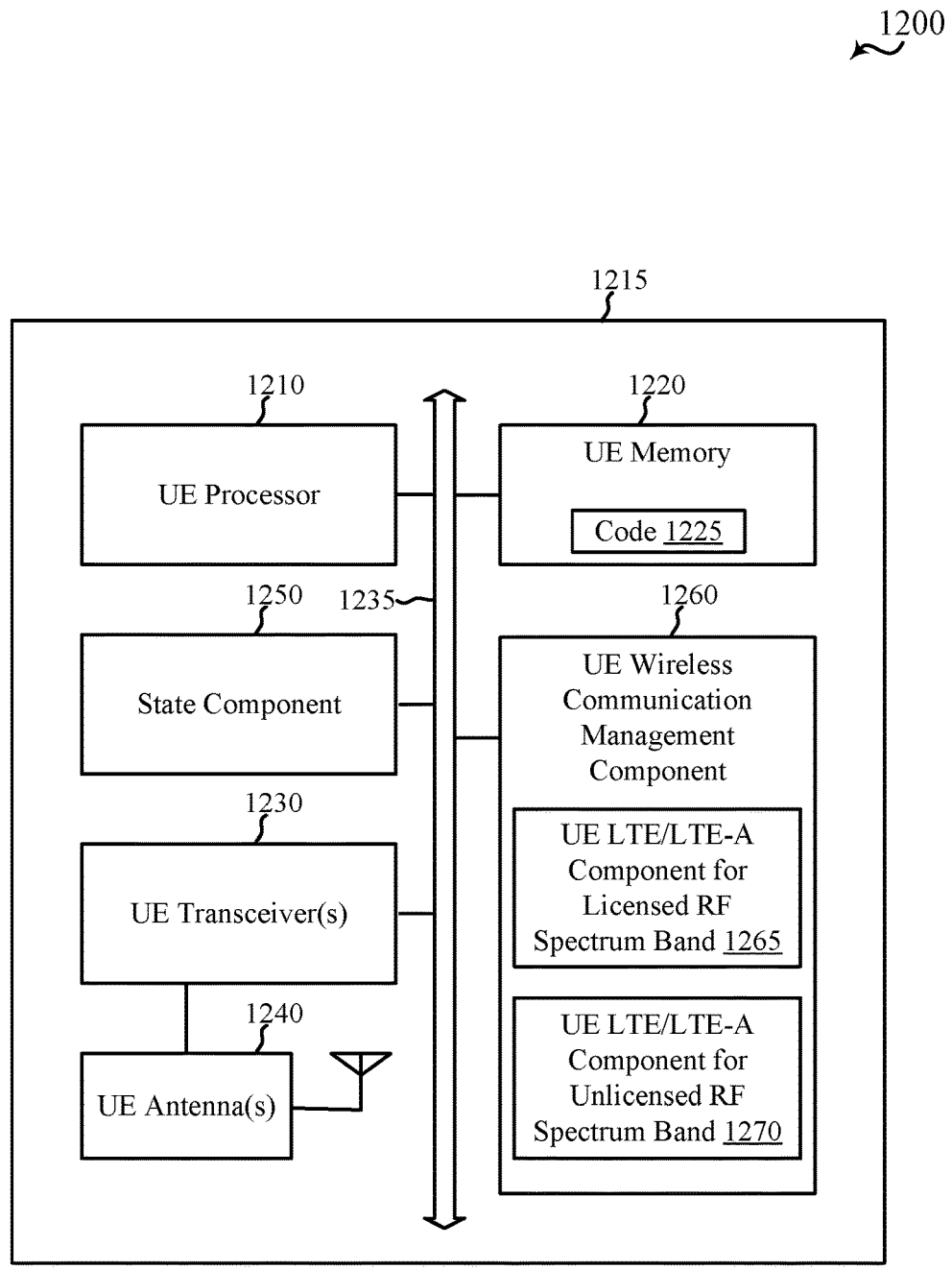
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may have various configurations and may be included or be part of a personal computer (e.g., a laptop computer, a netbook computer, a tablet computer, etc.), a cellular telephone, a smartphone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UE 115, 115-*a*, 215, 215-*a*, 215-*b*, and/or 215-*c* described with reference to FIGS. 1 and/or 2, aspects of one or more of the transmitting apparatuses 705 and/or 805 described with reference to FIGS. 7 and/or 8, and/or aspects of one or more of the receiving apparatuses 905 and/or 1005 described with reference to FIGS. 9 and/or 10. The UE 1215 may be configured to implement at least some of the UE, transmitting apparatus, and/or receiving apparatus features and functions described with reference to FIGS. 1, 2, 3, 4, 5, 6, 7, 8, 9, and/or 10.

The UE 1215 may include a UE processor 1210, a UE memory 1220, at least one UE transceiver (represented by UE transceiver(s) 1230), at least one UE antenna (represented by UE antenna(s) 1240), and/or a UE wireless communication management component 1260. Each of these components may be in communication with each other, directly or indirectly, over one or more buses 1235.

The UE memory 1220 may include RAM and/or ROM. The UE memory 1220 may store computer-readable, computer-executable code 1225 containing instructions that are configured to, when executed, cause the UE processor 1210 to perform various functions described herein related to wireless communication, including the transmission and/or reception of a channel occupancy identifier. Alternatively, the computer-executable code 1225 may not be directly executable by the UE processor 1210 but be configured to cause the UE 1215 (e.g., when compiled and executed) to perform various of the functions described herein.

The UE processor 1210 may include an intelligent hardware device, e.g., a CPU, a microcontroller, an ASIC, etc. The UE processor 1210 may process information received through the UE transceiver(s) 1230 and/or information to be sent to the UE transceiver(s) 1230 for transmission through the UE antenna(s) 1240. The UE processor 1210 may handle, alone or in connection with the UE wireless communication management component 1260, various aspects of communicating over (or managing communications over) a licensed radio frequency spectrum band (e.g., a radio frequency spectrum band for which transmitting apparatuses may not contend for access because the radio frequency spectrum band is licensed to users (e.g., LTE/LTE-A users), such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The UE transceiver(s) 1230 may include a modem configured to modulate packets and provide the modulated packets to the UE antenna(s) 1240 for transmission, and to demodulate packets received from the UE antenna(s) 1240. The UE transceiver(s) 1230 may, in some examples, be implemented as one or more UE transmitters and one or more separate UE receivers. The UE transceiver(s) 1230 may support communications in the licensed radio frequency spectrum band and/or the unlicensed radio frequency spectrum band. The UE transceiver(s) 1230 may be configured to communicate bi-directionally, via the UE antenna(s) 1240, with one or more of the base station 105, the first base station 205, and/or the second base station 205-*a* described with reference to FIGS. 1 and/or 2. While the UE 1215 may include a single UE antenna, there may be examples in which the UE 1215 may include multiple UE antennas 1240.

The UE state component 1250 may be used, for example, to manage transitions of the UE 1215 between an RRC idle state and an RRC connected state, and may be in communication with other components of the UE 1215, directly or indirectly, over the one or more buses 1235. The UE state component 1250, or portions of it, may include a processor, and/or some or all of the functions of the UE state component 1250 may be performed by the UE processor 1210 and/or in connection with the UE processor 1210.

The UE wireless communication management component 1260 may be configured to perform and/or control some or all of the UE, transmitting apparatus, and/or receiving apparatus features and functions described with reference to FIGS. 1, 2, 3, 4, 5, 6, 7, 8, 9, and/or 10 related to wireless communication over a licensed radio frequency spectrum band and/or an unlicensed radio frequency spectrum band. For example, the UE wireless communication management component 1260 may be configured to support a supplemental downlink mode, a carrier aggregation mode, and/or a standalone mode using the licensed radio frequency spectrum band and/or the unlicensed radio frequency spectrum band. The UE wireless communication management component 1260 may include a UE LTE/LTE-A component for licensed RF spectrum band 1265 configured to handle LTE/LTE-A communications in the licensed radio frequency spectrum band, and a UE LTE/LTE-A component for unlicensed RF spectrum band 1270 configured to handle LTE/LTE-A communications in the unlicensed radio frequency spectrum band. The UE wireless communication management component 1260, or portions of it, may include a processor, and/or some or all of the functions of the UE wireless communication management component 1260 may be performed by the UE processor 1210 and/or in connection with the UE processor 1210. In some examples, the UE wireless communication management component 1260 may be an example of the wireless communication management component 920 and/or 1020 described with reference to FIGS. 9 and/or 10.

Figure 13:
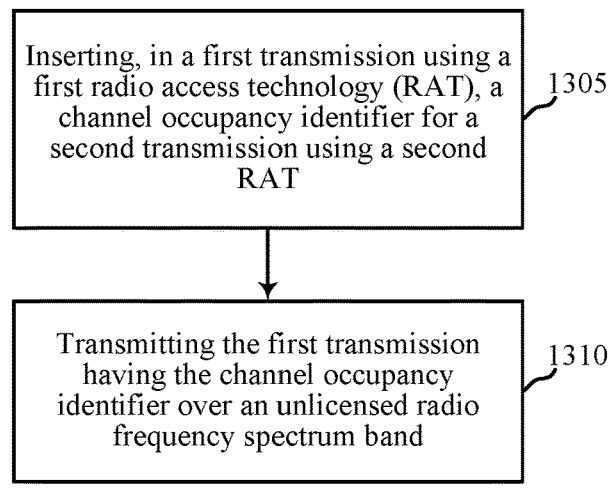
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more transmitting apparatuses (e.g., aspects of one or more of the base stations 105, 105-*a*, 205, 205-*a*, and/or 1105 described with reference to FIGS. 1, 2, and/or 11, aspects of one or more of the UEs 115, 115-*a*, 215, 215-*a*, 215-*b*, 215-*c*, and/or 1215 described with reference to FIGS. 1, 2, and/or 12, and/or aspects of one or more of the transmitting apparatuses 705 and/or 805 described with reference to FIGS. 7 and/or 8). In some examples, a transmitting apparatus may execute one or more sets of codes to control the functional elements of the transmitting apparatus to perform the functions described below. Additionally or alternatively, the transmitting apparatus may perform one or more of the functions described below using special-purpose hardware.

At block 1305, the method 1300 may include inserting, in a first transmission using a first RAT, a channel occupancy identifier for a second transmission using a second RAT. In some examples, the first RAT may be a cellular RAT and the second RAT may be a Wi-Fi RAT. The operation(s) at block 1305 may be performed using the wireless communication management component 720, 820, the base station wireless communication management component 1160, and/or the UE wireless communication management component 1260 described with reference to FIGS. 7, 8, 11, and/or 12, and/or the channel occupancy identifier insertion management component 740 and/or 850 described with reference to FIGS. 7 and/or 8.

In some examples of the method 1300, the channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In some examples of the method 1300, the channel occupancy identifier may identify a duration (e.g., a backoff period) for which the unlicensed radio frequency spectrum band is reserved. In some examples, the duration may include a number of OFDM symbol periods and/or a number of bytes.

At block 1310, the method 1300 may include transmitting the first transmission having the channel occupancy identifier over an unlicensed radio frequency spectrum band. In some examples, the unlicensed radio frequency spectrum band may include a radio frequency spectrum band for which transmitting apparatuses may contend for access because the radio frequency spectrum band is available for unlicensed use, such as Wi-Fi use. The operation(s) at block 1310 may be performed using the wireless communication management component 720, 820, the base station wireless communication management component 1160, and/or the UE wireless communication management component 1260 described with reference to FIGS. 7, 8, 11, and/or 12, the transmission management component 735 and/or 835 described with reference to FIGS. 7 and/or 8, the transmitter component 730 and/or 830 described with reference to FIGS. 7 and/or 8, and/or the base station transceiver(s) 1150 or UE transceiver(s) 1230 described with reference to FIG. 7 or 8.

Thus, the method 1300 may provide for wireless communication. It should be noted that the method 1300 is just one implementation and that the operations of the method 1300 may be rearranged or otherwise modified such that other implementations are possible.

Figure 14:
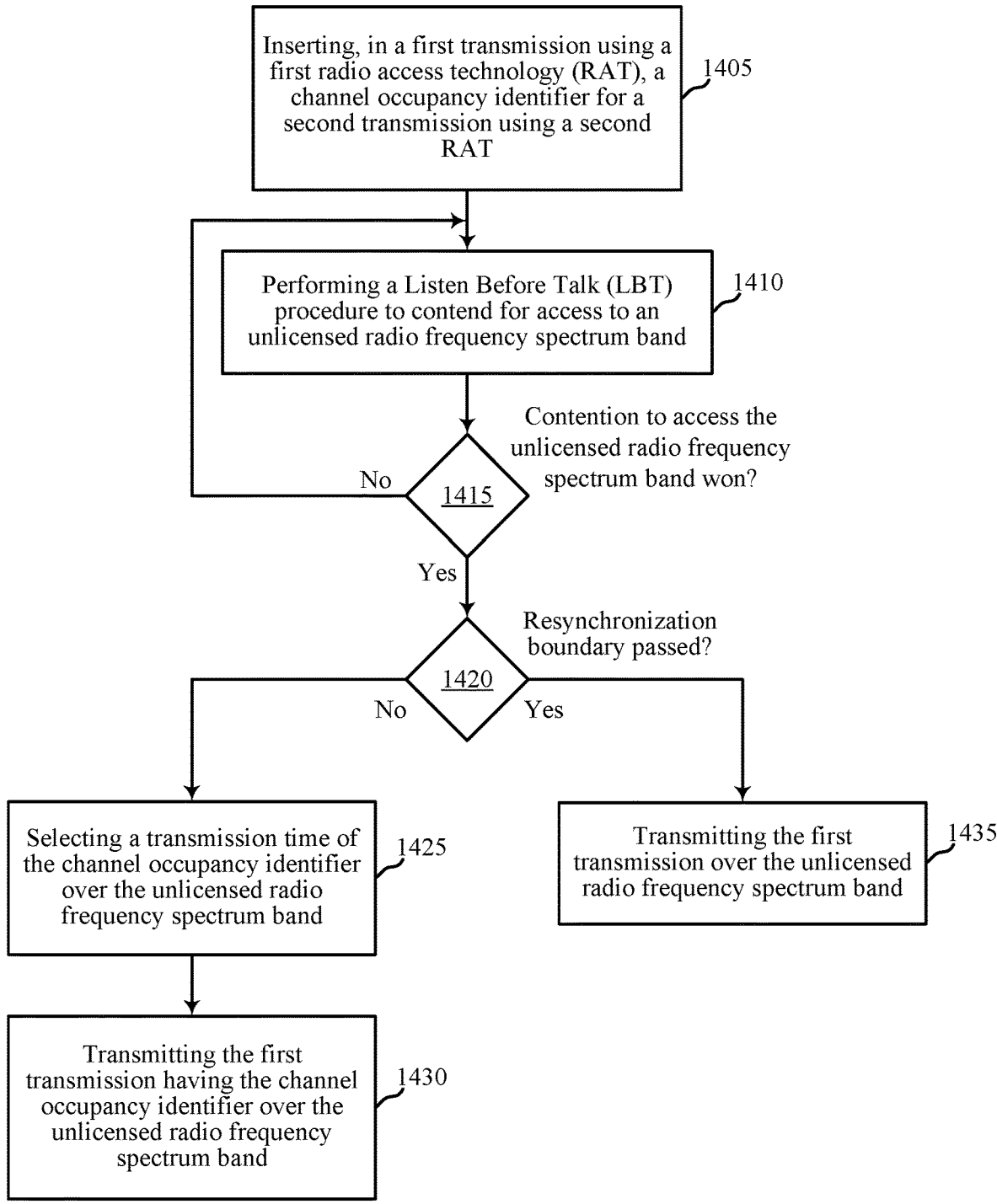
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more transmitting apparatuses (e.g., e.g., aspects of one or more of the base stations 105, 105-*a*, 205, 205-*a*, and/or 1105 described with reference to FIGS. 1, 2, and/or 11, aspects of one or more of the UEs 115, 115-*a*, 215, 215-*a*, 215-*b*, 215-*c*, and/or 1215 described with reference to FIGS. 1, 2, and/or 12, and/or aspects of one or more of the transmitting apparatuses 705 and/or 805 described with reference to FIGS. 7 and/or 8). In some examples, a transmitting apparatus may execute one or more sets of codes to control the functional elements of the transmitting apparatus to perform the functions described below. Additionally or alternatively, the transmitting apparatus may perform one or more of the functions described below using special-purpose hardware.

At block 1405, the method 1400 may include inserting, in a first transmission using a first RAT, a channel occupancy identifier for a second transmission using a second RAT. In some examples, the first RAT may be a cellular RAT and the second RAT may be a Wi-Fi RAT. The operation(s) at block 1405 may be performed using the wireless communication management component 720, 820, the base station wireless communication management component 1160, and/or the UE wireless communication management component 1260 described with reference to FIGS. 7, 8, 11, and/or 12, and/or the channel occupancy identifier insertion management component 740 and/or 850 described with reference to FIGS. 7 and/or 8.

In some examples of the method 1400, the channel occupancy identifier may identify a duration (e.g., a backoff period) for which an unlicensed radio frequency spectrum band is reserved. In some examples, the duration may include a number of OFDM symbol periods and/or a number of bytes.

In some examples, inserting the channel occupancy identifier in the first transmission may include inserting the channel occupancy identifier to precede a first data subframe of the first transmission. In some examples, inserting the channel occupancy identifier in the first transmission may include inserting the channel occupancy identifier in a data subframe of the first transmission. In some examples, inserting the channel occupancy identifier in the first transmission may include inserting a first instance of the channel occupancy identifier and a second instance of the channel occupancy identifier in the first transmission. In some examples, the first instance of the channel occupancy identifier may be inserted to precede a first data subframe of the first transmission, and the second instance of the channel occupancy identifier may be inserted in a data subframe of the first transmission.

In some examples, the channel occupancy identifier may be formatted using the wireless communication management component 720, 820, the base station wireless communication management component 1160, and/or the UE wireless communication management component 1260 described with reference to FIGS. 7, 8, 11, and/or 12, and/or the channel occupancy identifier formatter component 840 described with reference to FIG. 8. In some examples of the method 1400, the channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In examples of the method 1400 in which the channel occupancy identifier includes at least a portion of a Wi-Fi preamble, the Wi-Fi preamble may include at least a first symbol and a second symbol, and the Wi-Fi preamble may be formatted by rotating a constellation of the second symbol with respect to a constellation of the first symbol. The rotation (or non-rotation) of the second constellation may indicate, at least in part, a Wi-Fi preamble type to which the channel occupancy identifier corresponds. For example, the rotation of the second constellation may indicate whether the channel occupancy identifier corresponds to a IEEE Standard 802.11ac preamble. In some examples, the Wi-Fi preamble type to which the channel occupancy identifier corresponds may be used to interpret a backoff period indicated by the channel occupancy identifier (e.g., to determine whether the backoff period is specified as a number of OFDM symbol periods and/or a number of bytes). In some examples, the rotation of the second constellation may be performed using the wireless communication management component 720, 820, the base station wireless communication management component 1160, and/or the UE wireless communication management component 1260 described with reference to FIGS. 7, 8, 11, and/or 12, and/or the channel occupancy identifier formatter component 840 described with reference to FIG. 8.

At block 1410, the method 1400 may include performing an LBT procedure to contend for access to an unlicensed radio frequency spectrum band. In some examples, the unlicensed radio frequency spectrum band may include a radio frequency spectrum band for which transmitting apparatuses may contend for access because the radio frequency spectrum band is available for unlicensed use, such as Wi-Fi use.

At block 1415, the method 1400 may include determining whether contention to access the unlicensed radio frequency spectrum band has been won. When it is determined that contention to access the unlicensed radio frequency spectrum band has been won, the method 1400 may proceed to block 1420 (as shown), or in examples of the method 1400 in which the operation(s) at block 1420 are not performed, the method 1400 may proceed to block 1425. When it is determined that contention to access the unlicensed radio frequency spectrum band has not been won, the operation(s) at block 1405 and/or 1410 may be repeated. In some examples, the operation(s) at block 1405 and/or 1410 may be repeated after a delay (e.g., at a scheduled time for performing a next LBT procedure).

The operation(s) at block 1410 and/or 1415 may be performed using the wireless communication management component 720, 820, the base station wireless communication management component 1160, and/or the UE wireless communication management component 1260 described with reference to FIGS. 7, 8, 11, and/or 12, and/or the LBT component 845 described with reference to FIG. 8.

At block 1420, the method 1400 may include determining whether a resynchronization boundary has passed (e.g., the downlink resynchronization boundary 387 or the uplink resynchronization boundary 392 described with reference to FIG. 3). When it is determined that the resynchronization boundary has not passed, the method 1400 may proceed to block 1425. When it is determined that the resynchronization boundary has passed, the method 1400 may proceed to block 1435. The operation(s) at block 1420 may be performed using the wireless communication management component 720, 820, the base station wireless communication management component 1160, and/or the UE wireless communication management component 1260 described with reference to FIGS. 7, 8, 11, and/or 12, and/or the transmission management component 735 and/or 835 described with reference to FIGS. 7 and/or 8.

At block 1425, the method 1400 may include time-dithering a transmission time of the channel occupancy identifier over the unlicensed radio frequency spectrum band. In some examples, the method 1400 may include selecting a time-dithered transmission time for the channel occupancy identifier. The transmission time may be selected, for example, based at least in part on a cell identifier (e.g., a cell ID) and/or based at least in part on a PLMN identifier. The operation(s) at block 1425 may be performed using the wireless communication management component 720, 820, the base station wireless communication management component 1160, and/or the UE wireless communication management component 1260 described with reference to FIGS. 7, 8, 11, and/or 12, the transmission management component 735 and/or 835 described with reference to FIGS. 7 and/or 8, and/or the time-dithering component 855 described with reference to FIG. 8.

At block 1430, and based at least in part upon winning contention to access the unlicensed radio frequency spectrum band at blocks 1410 and 1415 and/or determining the resynchronization boundary has not passed at block 1420, the method 1400 may include transmitting the first transmission having the channel occupancy identifier over an unlicensed radio frequency spectrum band. The operation(s) at block 1430 may be performed using the wireless communication management component 720, 820, the base station wireless communication management component 1160, and/or the UE wireless communication management component 1260 described with reference to FIGS. 7, 8, 11, and/or 12, the transmission management component 735 and/or 835 described with reference to FIGS. 7 and/or 8, the transmitter component 730 and/or 830 described with reference to FIGS. 7 and/or 8, and/or the base station transceiver(s) 1150 or UE transceiver(s) 1230 described with reference to FIG. 7 or 8.

In some examples of the method 1400, the channel occupancy identifier may be transmitted as at least a portion of a CUBS, and the channel occupancy identifier may serve to reserve part or all of the unlicensed radio frequency spectrum band during its transmission over the unlicensed radio frequency spectrum band. In some examples, the portion of the CUBS may include at least a portion of a fractional CUBS. In some examples, the CUBS may be formatted and inserted in the first transmission using the wireless communication management component 720, 820, the base station wireless communication management component 1160, and/or the UE wireless communication management component 1260 described with reference to FIGS. 7, 8, 11, and/or 12, the transmission management component 735 and/or 835 described with reference to FIGS. 7 and/or 8, and/or the CUBS management component 860 described with reference to FIG. 8.

In some examples of the method 1400, the transmitting performed at block 1430 may be performed by a first transmitting apparatus; a first portion of the channel occupancy identifier may be common to a first portion of an overlapping transmission of a second channel occupancy identifier transmitted by a second transmitting apparatus; and a second portion of the second channel occupancy identifier may differ from a second portion of the second channel occupancy identifier transmitted by the second transmitting apparatus.

At block 1435, and based at least in part upon winning contention to access the unlicensed radio frequency spectrum band at block 1410, the method 1400 may include transmitting the first transmission having the channel occupancy identifier over an unlicensed radio frequency spectrum band. The operation(s) at block 1435 may be performed using the wireless communication management component 720, 820, the base station wireless communication management component 1160, and/or the UE wireless communication management component 1260 described with reference to FIGS. 7, 8, 11, and/or 12, the transmission management component 735 and/or 835 described with reference to FIGS. 7 and/or 8, the transmitter component 730 and/or 830 described with reference to FIGS. 7 and/or 8, and/or the base station transceiver(s) 1150 or UE transceiver(s) 1230 described with reference to FIG. 7 or 8.

Thus, the method 1400 may provide for wireless communication. It should be noted that the method 1400 is just one implementation and that the operations of the method 1400 may be rearranged or otherwise modified such that other implementations are possible.

Figure 15:
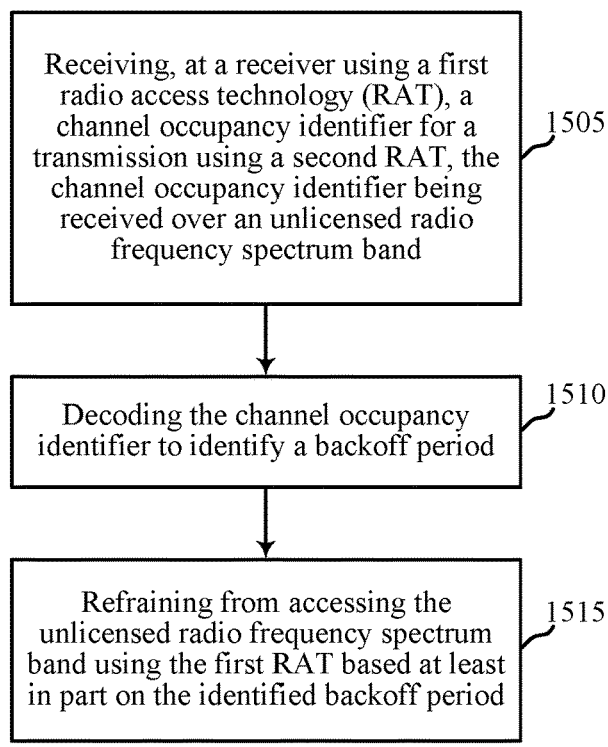
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more receiving apparatuses (e.g., aspects of one or more of the UEs 115, 115-*a*, 215, 215-*a*, 215-*b*, 215-*c*, and/or 1215 described with reference to FIGS. 1, 2, and/or 12, aspects of one or more of the base stations 105, 105-*a*, 205, 205-*a*, and/or 1105 described with reference to FIGS. 1, 2, and/or 11, and/or aspects of one or more of the receiving apparatuses 905 and/or 1005 described with reference to FIGS. 9 and/or 10). In some examples, a receiving apparatus may execute one or more sets of codes to control the functional elements of the receiving apparatus to perform the functions described below. Additionally or alternatively, the receiving apparatus may perform one or more of the functions described below using special-purpose hardware.

At block 1505, the method 1500 may include receiving, at a receiver using a first RAT, a channel occupancy identifier for a transmission using a second RAT. The channel occupancy identifier may be received over an unlicensed radio frequency spectrum band. In some examples, the unlicensed radio frequency spectrum band may include a radio frequency spectrum band for which transmitting apparatuses may contend for access because the radio frequency spectrum band is available for unlicensed use, such as Wi-Fi use. In some examples, the receiver may be a cellular receiver of a UE or a base station. In some examples, the first RAT may be a cellular RAT and the second RAT may be a Wi-Fi RAT. The operation(s) at block 1505 may be performed using the receiver component 910 and/or 1010 described with reference to FIGS. 9 and/or 10, the base station transceiver(s) 1150 or UE transceiver(s) 1230 described with reference to FIG. 11 or 12, the wireless communication management component 920, 1020, the base station wireless communication management component 1160, and/or the UE wireless communication management component 1260 described with reference to FIGS. 9, 10, 11, and/or 12, and/or the channel occupancy identifier processing component 935 and/or 1035 described with reference to FIGS. 9 and/or 10.

In some examples of the method 1500, the channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

In some examples of the method 1500, the channel occupancy identifier may be received as at least a portion of a CUBS (e.g., the channel occupancy identifier may serve to reserve part or all of the unlicensed radio frequency spectrum band during its transmission over the unlicensed radio frequency spectrum band). In some examples, the portion of the CUBS may include at least a portion of a fractional CUBS.

At block 1510, the method 1500 may include decoding the channel occupancy identifier to identify a backoff period. In some examples, the backoff period may include a number of OFDM symbol periods and/or a number of bytes. The operation(s) at block 1510 may be performed using the receiver component 910 and/or 1010 described with reference to FIGS. 9 and/or 10, the base station transceiver(s) 1150 or UE transceiver(s) 1230 described with reference to FIG. 11 or 12, the wireless communication management component 920, 1020, the base station wireless communication management component 1160, and/or the UE wireless communication management component 1260 described with reference to FIGS. 9, 10, 11, and/or 12, and/or the channel occupancy identifier processing component 935 and/or 1035 described with reference to FIGS. 9 and/or 10.

In some examples, an indication of whether the channel occupancy identifier was transmitted by a transmitter using the first RAT or a transmitter using the second RAT may be encoded in a number of bits of the channel occupancy identifier, such as a number of reserved bits (e.g., three bits) of the VHT-SIG-A1 465 and VHT-SIG-A2 470 described with reference to the third Wi-Fi packet 460 described with reference to FIG. 4. In these and other examples, the method 1500 may include decoding the channel occupancy identifier to determine whether the channel occupancy identifier was received from the transmitter using the first RAT or the transmitter using the second RAT. In some examples, the decoding may be performed using the receiver component 910 and/or 1010 described with reference to FIGS. 9 and/or 10, the base station transceiver(s) 1150 or UE transceiver(s) 1230 described with reference to FIG. 11 or 12, the wireless communication management component 920, 1020, the base station wireless communication management component 1160, and/or the UE wireless communication management component 1260 described with reference to FIGS. 9, 10, 11, and/or 12, and/or the channel occupancy identifier processing component 935 and/or 1035 described with reference to FIGS. 9 and/or 10.

In some examples, the channel occupancy identifier may include at least a first symbol and a second symbol, and the method 1500 may include decoding the channel occupancy identifier to detect a rotation (or non-rotation) of a second constellation of the second symbol with respect to a first constellation of the first symbol. The detected rotation (or non-rotation) of the second constellation may indicate, at least in part, a Wi-Fi preamble type to which the channel occupancy identifier corresponds. For example, the detected rotation (or non-rotation) of the second constellation may indicate whether the channel occupancy identifier corresponds to an IEEE Standard 802.11ac preamble. In some examples, the Wi-Fi preamble type to which the channel occupancy identifier corresponds may be used to interpret the backoff period indicated by the channel occupancy identifier (e.g., to determine whether the backoff period is specified as a number of OFDM symbol periods and/or a number of bytes). In some examples, the decoding and/or the interpretation of the backoff period may be performed using the receiver component 910 and/or 1010 described with reference to FIGS. 9 and/or 10, the base station transceiver(s) 1150 or UE transceiver(s) 1230 described with reference to FIG. 11 or 12, the wireless communication management component 920, 1020, the base station wireless communication management component 1160, and/or the UE wireless communication management component 1260 described with reference to FIGS. 9, 10, 11, and/or 12, and/or the channel occupancy identifier processing component 935 and/or 1035 described with reference to FIGS. 9 and/or 10.

At block 1515, the method 1500 may include refraining from accessing the unlicensed radio frequency spectrum band using the first RAT based at least in part on the backoff period identified at block 1510. The operation(s) at block 1515 may be performed using the wireless communication management component 920, 1020, the base station wireless communication management component 1160, and/or the UE wireless communication management component 1260 described with reference to FIGS. 9, 10, 11, and/or 12, and/or the transmission management component 940 and/or 1040 described with reference to FIGS. 9 and/or 10.

In some examples, the method 1500 may include detecting an energy level of the unlicensed radio frequency spectrum band. In some examples, the energy level of the unlicensed radio frequency spectrum band may be detected using the wireless communication management component 920, 1020, the base station wireless communication management component 1160, and/or the UE wireless communication management component 1260 described with reference to FIGS. 9, 10, 11, and/or 12, and/or the energy detection component 1045 described with reference to FIG. 10.

In some examples, the method 1500 may include refraining from accessing the unlicensed radio frequency spectrum band using the first RAT based at least in part on a detected energy level (e.g., refraining from accessing the unlicensed radio frequency spectrum band when the detected energy level satisfies a threshold). In some examples, the method 1500 may include refraining from accessing the unlicensed radio frequency spectrum band using the first RAT when a detected energy level fails to satisfy a threshold (e.g., refraining from accessing the unlicensed radio frequency spectrum band when the detected energy level fails to satisfy a threshold but a received channel occupancy identifier identifies a backoff period).

Thus, the method 1500 may provide for wireless communication. It should be noted that the method 1500 is just one implementation and that the operations of the method 1500 may be rearranged or otherwise modified such that other implementations are possible.

Figure 16:
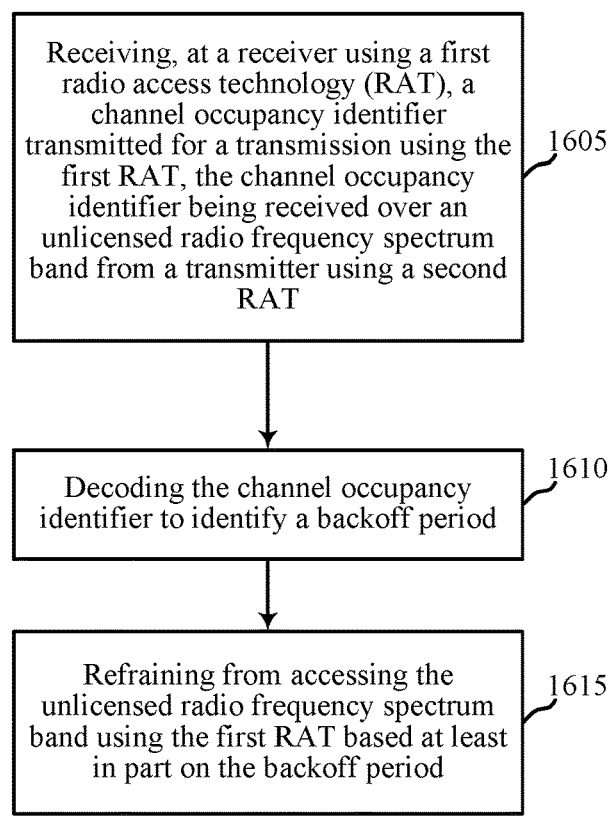
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more Wi-Fi receiving apparatuses (e.g., aspects of one or more of the Wi-Fi access points 135 and/or 135-*a* described with reference to FIG. 1, aspects of one or more of the Wi-Fi stations 140 and/or 140-*a* described with reference to FIG. 1, and/or aspects of one or more of the receiving apparatus 905 described with reference to FIG. 9). In some examples, a receiving apparatus may execute one or more sets of codes to control the functional elements of the receiving apparatus to perform the functions described below. Additionally or alternatively, the receiving apparatus may perform one or more of the functions described below using special-purpose hardware.

At block 1605, the method 1600 may include receiving, at a receiver using a first RAT, a channel occupancy identifier for a transmission using the first RAT. The channel occupancy identifier may be received over an unlicensed radio frequency spectrum band from a transmitter using a second RAT. In some examples, the unlicensed radio frequency spectrum band may include a radio frequency spectrum band for which transmitting apparatuses may contend for access because the radio frequency spectrum band is available for unlicensed use, such as Wi-Fi use. In some examples, the receiver may be a Wi-Fi receiver of a Wi-Fi access point or a Wi-Fi station. In some examples, the first RAT may be a Wi-Fi RAT and the second RAT may be a cellular RAT. The operation(s) at block 1605 may be performed using the receiver component 910, the wireless communication management component 920, and/or the channel occupancy identifier processing component 935 described with reference to FIG. 9.

In some examples of the method 1600, the channel occupancy identifier may include at least a portion of a Wi-Fi preamble. For example, the channel occupancy identifier may include at least a portion of an IEEE Standard 802.11a preamble, an IEEE Standard 802.11n preamble, an IEEE Standard 802.11ac preamble, or an IEEE Standard 802.11ax preamble. In some examples, the portion of the Wi-Fi preamble may include an entire Wi-Fi preamble.

At block 1610, the method 1600 may include decoding the channel occupancy identifier to identify a backoff period. In some examples, the backoff period may include a number of OFDM symbol periods and/or a number of bytes. The operation(s) at block 1610 may be performed using the receiver component 910, the wireless communication management component 920, and/or the channel occupancy identifier processing component 935 described with reference to FIG. 9.

In some examples, the channel occupancy identifier may include at least a first symbol and a second symbol, and the method 1600 may include decoding the channel occupancy identifier to detect a rotation of a constellation of the second symbol with respect to a constellation of the first symbol. The detected rotation of the second constellation may indicate, at least in part, a Wi-Fi preamble type to which the channel occupancy identifier corresponds. For example, the detected rotation of the second constellation may indicate whether the channel occupancy identifier corresponds to a IEEE Standard 802.11a preamble, an IEEE Standard 802.11n preamble, an IEEE Standard 802.11ac preamble, or an IEEE Standard 802.11ax preamble. In some examples, the Wi-Fi preamble type to which the channel occupancy identifier corresponds may be used to interpret the backoff period indicated by the channel occupancy identifier (e.g., determine whether the backoff period is specified as a number of OFDM symbol periods and/or a number of bytes). In some examples, the decoding and/or the interpretation of the backoff period may be performed using the receiver component 910, the wireless communication management component 920, and/or the channel occupancy identifier processing component 935 described with reference to FIG. 9.

At block 1615, the method 1600 may include refraining from accessing the unlicensed radio frequency spectrum band using the first RAT based at least in part on the backoff period identified at block 1610. The operation(s) at block 1615 may be performed using the wireless communication management component 920 and/or the transmission management component 940 described with reference to FIG. 9.

In some examples, the method 1600 may include detecting an energy level of the unlicensed radio frequency spectrum band. In some examples, the energy level of the unlicensed radio frequency spectrum band may be detected using the wireless communication management component 920 described with reference to FIG. 9.

In some examples, the method 1600 may include refraining from accessing the unlicensed radio frequency spectrum band using the first RAT based at least in part on a detected energy level (e.g., refraining from accessing the unlicensed radio frequency spectrum band when the detected energy level satisfies a threshold). In some examples, the method 1600 may include refraining from accessing the unlicensed radio frequency spectrum band using the first RAT when a detected energy level fails to satisfy a threshold (e.g., refraining from accessing the unlicensed radio frequency spectrum band when the detected energy level fails to satisfy a threshold but a received channel occupancy identifier identifies a backoff period).

In some examples, the method 1600 may include refraining from increasing a contention window size (e.g., a time period for which an apparatus performing the method 1600 refrains from accessing the unlicensed radio frequency spectrum band following a failure to successfully contend for access to the unlicensed radio frequency spectrum band) upon identifying the backoff period.

Thus, the method 1600 may provide for wireless communication. It should be noted that the method 1600 is just one implementation and that the operations of the method 1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, at a receiver using a first radio access technology (RAT), a channel occupancy identifier for a transmission using a second RAT, the channel occupancy identifier being received over an unlicensed radio frequency spectrum band, the channel occupancy identifier includes at least a portion of a Wi-Fi preamble having at least seven symbols;
   identifying a type of the channel occupancy identifier based at least in part on constellation of a sixth symbol and a seventh symbol of the channel occupancy identifier;
   decoding the channel occupancy identifier to identify a backoff period; and
   refraining from accessing the unlicensed radio frequency spectrum band using the first RAT based at least in part on the backoff period.

2. The method of claim 1, further comprising:
   detecting an energy level of the unlicensed radio frequency spectrum band.

3. The method of claim 2, further comprising:
   refraining from accessing the unlicensed radio frequency spectrum band using the first RAT based at least in part on the energy level.

4. The method of claim 2, further comprising:
   refraining from accessing the unlicensed radio frequency spectrum band using the first RAT when the energy level fails to satisfy a threshold.

5. The method of claim 1, further comprising:
   decoding the channel occupancy identifier to determine whether the channel occupancy identifier was received from a first transmitter using the first RAT or a second transmitter using the second RAT.

6. The method of claim 1, wherein the backoff period comprises a number of orthogonal frequency division multiplexed (OFDM) symbol periods.

7. The method of claim 6, further comprising:
setting a network allocation vector based at least in part on the number of OFDM symbol periods.

8. The method of claim 1, wherein the channel occupancy identifier is received in a punctured transmission.

9. The method of claim 1, wherein the receiver using the first RAT comprises a cellular receiver of a user equipment (UE).

10. The method of claim 1, wherein the receiver using the first RAT comprises a cellular receiver of a base station.

11. The method of claim 1, wherein the channel occupancy identifier is received in a punctured transmission.

12. An apparatus for wireless communication, comprising:
a processor;
memory coupled with the processor; and
instructions stored in the memory, the instructions being executable by the processor to:
receive, at a receiver using a first radio access technology (RAT), a channel occupancy identifier using a second RAT, the channel occupancy identifier being received over an unlicensed radio frequency spectrum band, the channel occupancy identifier includes at least a portion of a Wi-Fi preamble having at least seven symbols;
identify a type of the channel occupancy identifier based at least in part on constellation of a sixth symbol and a seventh symbol of the channel occupancy identifier;
decode the channel occupancy identifier to identify a backoff period; and
refrain from accessing the unlicensed radio frequency spectrum band using the first RAT based at least in part on the backoff period.

13. The apparatus of claim 12, wherein the instructions are further executable by the processor to:
detect an energy level of the unlicensed radio frequency spectrum band.

14. The apparatus of claim 13, wherein the instructions are further executable by the processor to:
refrain from accessing the unlicensed radio frequency spectrum band using the first RAT based at least in part on the energy level.

15. The apparatus of claim 13, wherein the instructions are further executable by the processor to:
refrain from accessing the unlicensed radio frequency spectrum band using the first RAT when the energy level fails to satisfy a threshold.

16. The apparatus of claim 12, wherein the backoff period comprises a number of orthogonal frequency division multiplexed (OFDM) symbol periods.

17. The apparatus of claim 16, wherein the instructions are further executable by the processor to:
set a network allocation vector based at least in part on the number of OFDM symbol periods.

18. An apparatus for wireless communication, comprising:
means for receiving, at a receiver using a first radio access technology (RAT), a channel occupancy identifier for a transmission using a second RAT, the channel occupancy identifier being received over an unlicensed radio frequency spectrum band, the channel occupancy identifier includes at least a portion of a Wi-Fi preamble having at least seven symbols;
means for identifying a type of the channel occupancy identifier based at least in part on constellation of a sixth symbol and a seventh symbol of the channel occupancy identifier;
means for decoding the channel occupancy identifier to identify a backoff period; and
means for refraining from accessing the unlicensed radio frequency spectrum band using the first RAT based at least in part on the backoff period.

19. The apparatus of claim 18, further comprising:
means for detecting an energy level of the unlicensed radio frequency spectrum band.

20. The apparatus of claim 19, further comprising:
means for refraining from accessing the unlicensed radio frequency spectrum band using the first RAT based at least in part on the energy level.

21. A non-transitory computer-readable medium storing computer-executable code for wireless communication, the code executable by a processor to:
receive, at a receiver using a first radio access technology (RAT), a channel occupancy identifier for a transmission using a second RAT, the channel occupancy identifier being received over an unlicensed radio frequency spectrum band, the channel occupancy identifier includes at least a portion of a Wi-Fi preamble having at least seven symbols;
identify a type of the channel occupancy identifier based at least in part on constellation of a sixth symbol and a seventh symbol of the channel occupancy identifier;
decode the channel occupancy identifier to identify a backoff period; and
refrain from accessing the unlicensed radio frequency spectrum band using the first RAT based at least in part on the backoff period.

22. The non-transitory computer-readable medium of claim 21, wherein the code is executable by the processor to:
detect an energy level of the unlicensed radio frequency spectrum band.

* * * * *